(12) United States Patent
Kim et al.

(10) Patent No.: US 11,770,693 B2
(45) Date of Patent: Sep. 26, 2023

(54) ELECTRONIC DEVICE FOR SETTING ADDRESS INFORMATION AND METHOD FOR OPERATING SAME

(71) Applicant: Samsung Electronics Co., Ltd., Gyeonggi-do (KR)

(72) Inventors: Hyeonggeun Kim, Gyeonggi-do (KR); Daehui Kang, Gyeonggi-do (KR); Chunho Park, Gyeonggi-do (KR); Seungnyun Kim, Gyeonggi-do (KR); Jeongmin Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/689,090

(22) Filed: Mar. 8, 2022

(65) Prior Publication Data

US 2022/0191669 A1   Jun. 16, 2022

Related U.S. Application Data

(63) Continuation of application No. PCT/KR2020/007501, filed on Jun. 10, 2020.

(30) Foreign Application Priority Data

Sep. 16, 2019   (KR) .................. 10-2019-0113391

(51) Int. Cl.
*H04W 4/80* (2018.01)
*H04W 76/10* (2018.01)
*H04W 8/26* (2009.01)

(52) U.S. Cl.
CPC .............. *H04W 4/80* (2018.02); *H04W 8/26* (2013.01); *H04W 76/10* (2018.02)

(58) Field of Classification Search
CPC ......... H04W 4/80; H04W 76/10; H04W 8/26; H04W 76/15; H04W 8/005
See application file for complete search history.

(56) References Cited

U.S. PATENT DOCUMENTS

2014/0134947 A1* 5/2014 Stouder-Studenmund .................. H04L 67/14
455/41.2
2017/0013346 A1* 1/2017 Lee ......................... H04W 4/80
(Continued)

FOREIGN PATENT DOCUMENTS

KR   10-2017-0006716 A   1/2017
KR   10-2018-0076863 A   7/2018

*Primary Examiner* — Tuan H Nguyen
(74) *Attorney, Agent, or Firm* — Cha & Reiter, LLC

(57) ABSTRACT

According to certain embodiments, an electronic device comprises a short-range communication module, a processor operatively connected to the short-range communication module, and a memory operatively connected to the processor, wherein the memory may store instructions which, when executed, cause the processor to: confirm that the electronic device is inserted into a first external electronic device; obtain setting information regarding a Bluetooth communication connection from the first external electronic device by using the short-range communication module; confirm whether a condition for setting address information of the electronic device is satisfied; and on the basis of confirming that the condition is satisfied, set the address information of the electronic device by using the setting information. Various other embodiments are possible.

10 Claims, 17 Drawing Sheets

(56) References Cited

U.S. PATENT DOCUMENTS

2017/0201886 A1  7/2017  Yang et al.
2018/0376233 A1  12/2018 Watson et al.
2019/0158999 A1  5/2019  Ilami et al.
2019/0347216 A1  11/2019 Cheon et al.

* cited by examiner

ELECTRONIC DEVICE FOR SETTING ADDRESS INFORMATION AND METHOD FOR OPERATING SAME

CROSS-REFERENCE TO RELATED APPLICATION(S)

This application is a continuation of International Application No. PCT/KR2020/007501, filed on Jun. 10, 2020, which claims priority to Korean Patent Application No. 10-2019-0113391, filed on Sep. 16, 2019 in the Korean Intellectual Property Office, the disclosures of which are herein incorporated by reference.

TECHNICAL FIELD

The present disclosure relates generally to a method and an apparatus for configuring address information of an electronic device wirelessly receiving audio data.

BACKGROUND

With the development of digital technology, electronic devices are provided in various forms such as smartphones, tablet personal computers (PCs), and personal digital assistants (PDAs). Electronic devices are becoming smaller and wearable to improve portability and user accessibility.

For example, the electronic device may be an ear-pluggable device which can be worn on a user's ears. The ear-wearable device may be connected to an external electronic device to receive audio data (or audio content). The ear-wearable device may also output audio data (or audio content) received from the external electronic device through a speaker.

For pairing for communication between an electronic device and another electronic device (for example, detachable earphones) during an initial stage, each electronic device may store in advance its own address information and a counterpart's address information. However, when two electronic devices are communicatively coupled and address information of each other is being configured, there may be instances when one of the electronic devices is disconnected, then the user has difficulty in directly configuring address information for coupling between the electronic device, which is not lost, and a new electronic device. As a result, undesirable time is lost to establish the connection.

SUMMARY

Certain embodiments may provide an electronic device capable of performing smooth communication with another electronic device by newly configuring at least one piece of the address information of the electronic device or the address information of another electronic device in the electronic device by using an external electronic device (for example, case or charger) for storing the electronic device and another electronic device.

According to certain embodiments, an electronic device includes a short-range communication module, a processor operatively connected to the short-range communication module, and a memory operatively connected to the processor, wherein the memory stores instructions causing the processor to, when executed, identify or detect an insertion of the electronic device into a first external electronic device, acquire configuration information related to a Bluetooth communication connection from the first external electronic device through the short-range communication module, identify whether conditions for configuring address information of the electronic device are satisfied, and configure the address information of the electronic device using the configuration information, based on identification of satisfaction of the conditions.

According to certain embodiments, a method of configuring address information by an electronic device includes identifying or detecting that the electronic device is inserted into a first external electronic device, acquiring configuration information related to a Bluetooth communication connection from the first external electronic device through a short-range communication module, identifying whether conditions for configuring address information of the electronic device are satisfied, and configuring the address information of the electronic device using the configuration information, based on identification of satisfaction of the conditions.

According to certain embodiments, an electronic device for storing at least one of a first electronic device or a second electronic device includes a short-range communication module, a processor operatively connected to the short-range communication module, and a memory operatively connected to the processor and configured to store configuration information related to a Bluetooth communication connection, wherein the memory stores instructions causing the processor to, when executed, identify that at least one of the first audio electronic device or the second audio electronic device 202 is inserted into the electronic device, make a request for identifying a configuration of address information of at least one of first audio electronic device or the second audio electronic device to the first external electronic device through the short-range communication module, and transmit the configuration information to at least one of the first audio electronic device or the second audio electronic device on the basis of acquisition of an acceptance response to the identification request from the first external electronic device 205 through the short-range communication module.

According to certain embodiments, an electronic device inserted into an external electronic device can newly configure address information of the electronic device by using configuration information related to a Bluetooth communication connection acquired from the external electronic device, thereby easily performing a connection configuration operation for a Bluetooth communication connection between an electronic device and other devices.

DETAILED DESCRIPTION

Figure 1:
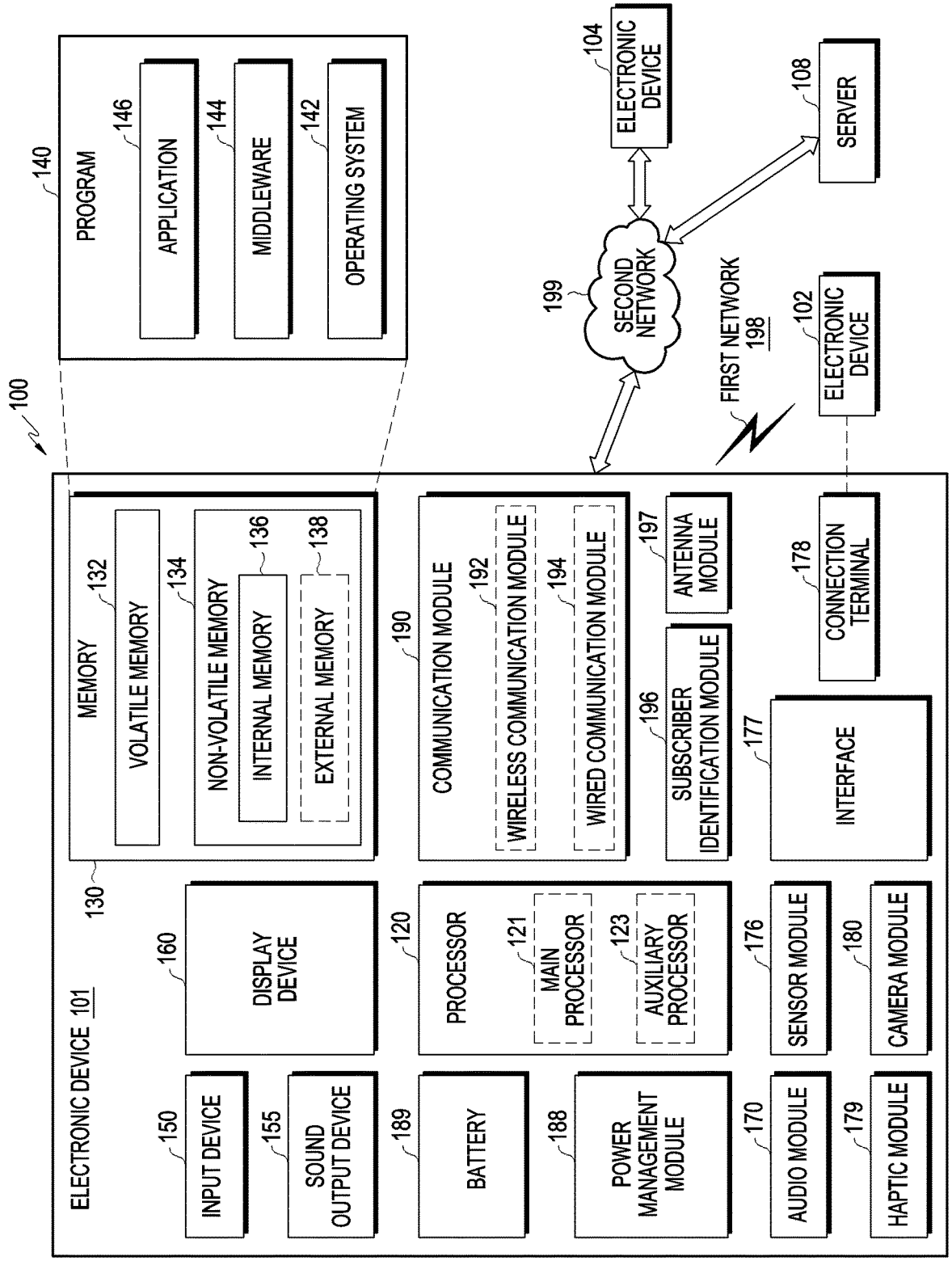
FIG. 1 is a block diagram illustrating an electronic device within a network environment according to certain embodiments.

FIG. 1 is a block diagram illustrating an electronic device 101 in a network environment 100 according to certain embodiments. As shown, FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). In operation, the electronic device 101 may communicate with the electronic device 104 via the server 108. The electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 operatively coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or configured to be specific to a given function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as a part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information/images to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). One of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). It should be noted that these various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., PCB). The antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
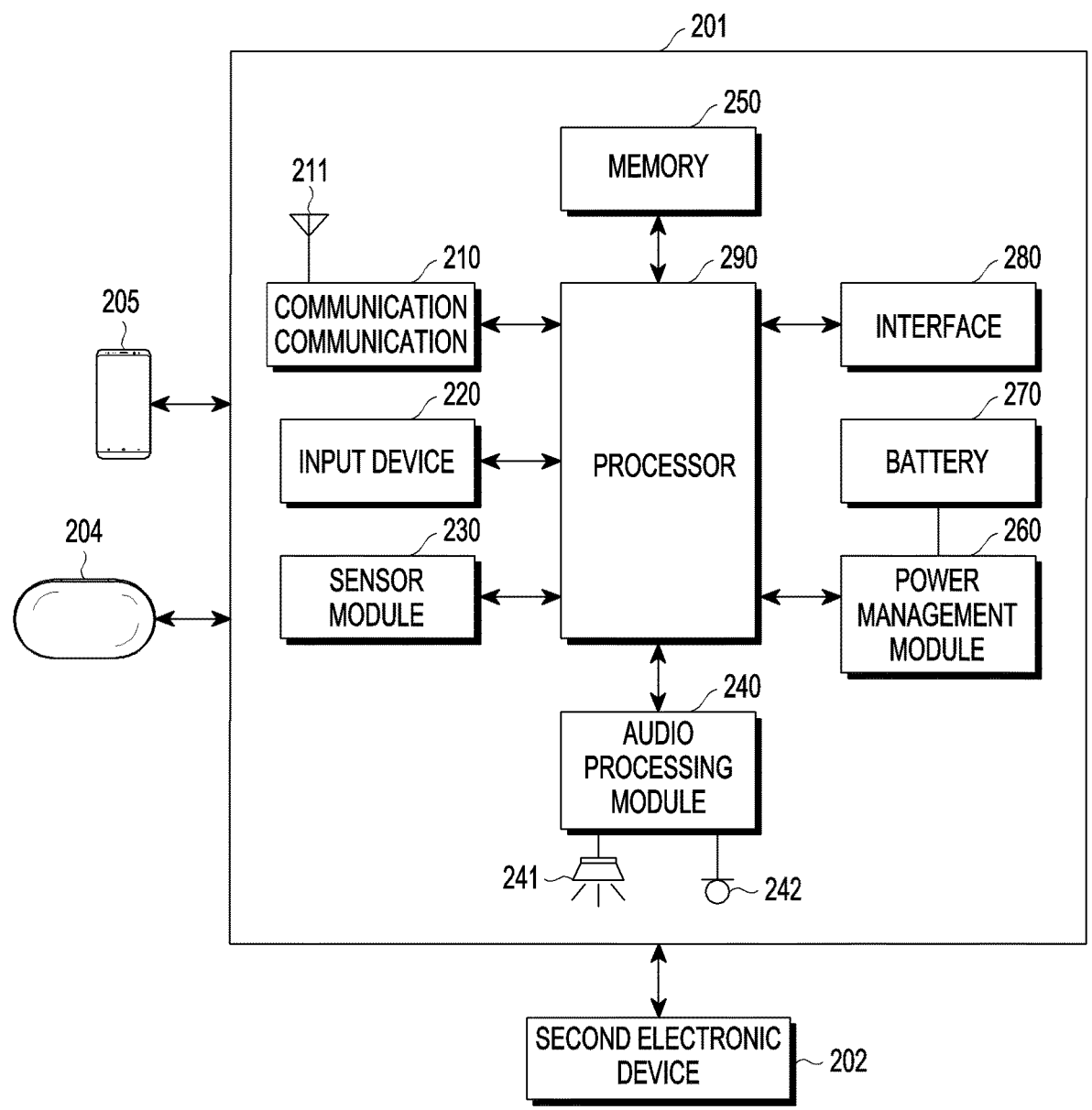
FIG. 2 is a block diagram illustrating a first electronic device for wirelessly receiving audio data from an external electronic device according to certain embodiments.

FIG. 2 is a block diagram of a first electronic device 201 for wirelessly receiving audio data from an external electronic device 205 (for example, the electronic device 101 of FIG. 1) according to certain embodiments.

According to certain embodiments, the first electronic device 201 may be the electronic device 101 of FIG. 1. The first electronic device 201 may be the external electronic device 102 of FIG. 1 or the external electronic device 104 of FIG. 1. The first electronic device 201 may include an antenna 211 (for example, the antenna module 197 of FIG. 1), a communication module 210 (for example, the communication module 190 of FIG. 1), an input device 220 (for example, the input device 150 of FIG. 1), a sensor module 230 (for example, the sensor module 176 of FIG. 1), an audio processing module 240 (for example, the audio module 170 of FIG. 1), a memory 250 (for example, the memory 130 of FIG. 1), a power management module 260 (for example, the power management module 188 of FIG. 1), a battery 270 (for example, the battery 189 of FIG. 1), an interface 280 (for example, the interface 177 of FIG. 1), and a processor 290 (for example, the processor 120 of FIG. 1).

The communication module 210 may include a wireless communication module (for example, a cellular communication module, a wireless fidelity (Wi-Fi) communication module, a Bluetooth communication module, a near field communication (NFC) module, and a global navigation satellite system (GNSS) communication module) or a wired communication module (for example, a local area network (LAN) communication module or a power line communication module). Among the communication modules, the corresponding communication module may communicate with at least one of a first external electronic device 204 (for example, charging device), a second external electronic device 205 (for example, portable terminal), or a second electronic device 202 through a first network (for example, the first network 198 of FIG. 1) or a second network (for example, the second network 199 of FIG. 1). The second electronic device 202 may be an earbud which forms a pair with the first electronic device 201. The communication module 210 may operate independently from the processor 290 and may include one or more communication processors supporting direct (for example, wired) communication or wireless communication.

The antenna module 211 may transmit a signal or power to another electronic device (for example, the external electronic device 204 or 205 or the second electronic device 202) or receive the same from another electronic device. According to an embodiment, the antenna module 211 may include one antenna including a conductor configured on a substrate (for example, a printed circuit board (PCB)) or a radiator configured in a conductive pattern. The antenna module 211 may include a plurality of antennas. In this case, at least one antenna suitable for a communication scheme used for the communication network such as the first network (for example, the first network 198 of FIG. 1) or the second network (for example, the second network 199 of FIG. 2) may be selected by, for example, the communication module 210 from among the plurality of antennas. The signal or power may be transmitted or received between the communication module 210 and another electronic device through at least one selected antenna. In some embodiments, a component (for example, RFIC) other than the radiator may be additionally configured as a portion of the antenna module 211.

According to certain embodiments, the antenna module 211 may include at least one of a coil for inducing a current by a magnetic field to wirelessly receive power from another electronic device (for example, the external electronic device 204 or 205 or the second electronic device 202), a resonator for generating a resonant phenomenon by a magnetic field having a specific resonance frequency, or a plurality of patch antennas for receiving electromagnetic waves.

The input device 220 may be configured to generate various input signals required for operating the first electronic device 201. The input device 220 may include a touch pad, a touch panel, or a button. The touch pad may recognize a touch input based on at least one scheme among, for example, a capacitive scheme, a resistive scheme, an infrared scheme, and an ultrasonic scheme. When a capacitive touch pad is provided, physical contact or proximity recognition is possible. The touch pad may further include a tactile layer. The touch pad including the tactile layer may provide tactile reaction to a user. The button may include, for example, a physical button or an optical key.

According to certain embodiments, the input device 220 may generate a user input related to on or off of the first electronic device 201. The input device 220 may receive a user input for a communication connection between the first electronic device 201 and the second external electronic device 205. The input device 220 may receive a user input related to audio data (or audio content). For example, the user input may be associated with a function of starting reproduction of audio data, pausing reproduction of audio data, stopping reproduction of audio data, controlling a reproduction speed, controlling a reproduction volume, and/or controlling muting. The operation of the first electronic device 201 may be controlled by various gestures of tapping the surface on which the touch pad is installed or swiping the touch pad upward and downward. In operation, when a gesture for a single tap is detected through the input device 220, the first electronic device 201 (or the processor 290) may reproduce audio data or pause the playback. According to an embodiment, when a gesture for two taps is detected through the input device 220, the first electronic device 201 may switch the reproduction to next audio data. When a gesture for three taps is detected through the input device 220, the first electronic device 201 may switch the reproduction to previous audio data. According to an embodiment, a gesture of up or down swiping is detected through the input device 220, the first electronic device 201 may control a volume for reproduction of the audio data. According to an embodiment, when the gesture for two taps is detected through the input device 220 while a phone call is received, the first electronic device 201 may connect the phone call.

The sensor module 230 may measure a physical quantity or detect an operation state of the first electronic device 201. The sensor module 230 may convert measured or detected information into an electric signal. The sensor module 230 may include, for example, an acceleration sensor, a gyro sensor, a geomagnetic sensor, a magnetic sensor, a proximity sensor, a gesture sensor, a grip sensor, an optical sensor, or a biometric sensor. In an embodiment, the first electronic device 201 may further include an optical sensor. The optical sensor may include a light emitter (for example, light emitting diode (LED)) for outputting light in at least one wavelength band. The optical sensor may include a light receiver (for example, photodiode) for receiving light in one or more wavelength bands scattered or reflected from an object to generate an electric signal.

The audio processing module 240 may support an audio data collection function. The audio processing module 240 may reproduce the collected audio data. According to an embodiment, the audio processing module 240 may include an audio decoder (not shown) and a D/A converter (not shown). The audio decoder may convert the audio data stored in the memory 250 into a digital audio signal. The D/A converter may convert the digital audio signal converted by the audio decoder into an analog audio signal. According to certain embodiments, the audio decoder may convert audio data received from the second external electronic device 205 through the communication module 210 and stored in the memory 250 into a digital audio signal. The speaker 241 may output an analog audio signal converted by the D/A converter. According to an embodiment, the audio processing module 240 may include an A/D converter (not shown). The A/D converter may convert an analog voice signal transmitted through the microphone 242 into a digital voice signal.

According to certain embodiments, the audio processing module 240 may reproduce various pieces of audio data configured in the operation of operating the first electronic device 201. For example, the audio processing module 240 may be designed to reproduce audio data related to a corresponding effect or notification sound when the connection of the first electronic device 201 to ears is detected or the separation from ears is detected. According to certain embodiments, the audio processing module 240 may be designed to reproduce audio data related to a corresponding effect or notification sound when the connection of the first electronic device 201 to the first external electronic device 204 is detected or separation from the first external electronic device 204 is detected. The output of the effect sound or notification sound may be omitted according to user settings or designer intent. According to certain embodiments, the audio processing module 240 may be designed to be included in the processor 290.

The memory 250 may store various pieces of data used by at least one element of the first electronic device 201 (for example, the processor 290 or the sensor module 230). The data may include, for example, software and input data or output data on a command related thereto. The memory 250 may include volatile memory or non-volatile memory.

According to an embodiment, the memory 250 may include a nonvolatile memory for storing first audio data (nonvolatile audio data) received from the second external electronic device 205. According to certain embodiments, the memory 250 may include a volatile memory for storing second audio data (for example, volatile audio data) received from the second external electronic device 205.

According to an embodiment, the memory 250 may store local address information, peer address information, and authentication address information. According to an embodiment, local address information of the first electronic device 201 may indicate a Bluetooth device address (for example, BD_ADDR) of the first electronic device 201, and peer address information of the first electronic device 201 may indicate a Bluetooth device address of a counterpart device (for example, the second electronic device 202) which forms a pair with the first electronic device 201 in a Bluetooth network. The local address information and the peer address information of the first electronic device 201 may be used for a communication connection with the counterpart device (for example, the second electronic device 202) which is a pair with the first electronic device 201 and a communication connection with the second external electronic device 205. According to an embodiment, the local address information or the peer address information may be the form of a Bluetooth device address (for example, BD_ADDR) in the size of 6 bytes or the form of LE address information generated on the basis of the Bluetooth device address. According to an embodiment, authentication address information of the first electronic device 201 is address information of the first external electronic device 204 for storing the first electronic device 201, may include communication address information of the first external electronic device 301 (for example, MAC address or Bluetooth address) or unique identification information such as a serial number configured by a manufacturer of the first external electronic device 301, and may be configured in the first electronic device 201. According to an embodiment, an initial state of the first external electronic device 201 may include a state in which authentication address information is not configured.

The power management module 260 may manage power supplied to the first electronic device 201. According to an embodiment, the power management module 260 may be implemented as, for example, at least a part of a power management integrated circuit (PMIC). The power management module 260 may include a battery charging module. In operation, when another electronic device (for example, the external electronic device 204 or 205) or the second electronic device 202 is electrically connected to the first electronic device 201 (wirelessly or wiredly), the power management module 260 may receive power from another electronic device to charge the battery 270. When the first electronic device 201 is inserted into the first external electronic device 204 while power of the first electronic device 201 is turned off, the first electronic device 201 may turn on power of the first electronic device 201 or turn on at least a portion of the communication module 210 on the basis of power supplied from another electronic device.

The battery 270 may supply power to at least one element of the first electronic device 201. According to an embodiment, the battery 270 may include, for example, non-rechargeable primary cell, a rechargeable secondary cell, or a fuel cell. When the first electronic device 201 is inserted into the first external electronic device 204, the first electronic device 201 may turn on power of the first electronic device 201 or turn on at least a portion of the communication module 210 after charging the battery 270 up to a predetermined charging level.

The interface 280 may support one or more predetermined protocols which can be used to be directly or wirelessly connect the first electronic device 201 to the external electronic device 204 or 205. According to an embodiment, the interface 280 may include, for example, a High-Definition Multimedia Interface (HDMI), a Universal Serial Bus (USB) interface, an SD card interface, or an audio interface. The interface 280 may include a connection terminal for establishing a physical connection with the first external electronic device 204.

According to certain embodiments, the first electronic device 201 may include a display device (not shown). The display device may be configured to provide various screen interfaces required for operating the first electronic device 201. The display device may provide a user interface related to reproduction of audio data. The display device may provide a user interface related to a function of receiving audio data from the second external electronic device 205 or a function of transmitting audio data to the second external electronic device 205. According to certain embodiments, the display device may include a light-emitting means such as a light emitting diode (LED). For example, the light-emitting means may be controlled to emit a color corresponding to charging or completion of charging. In operation, when the first electronic device 201 is being connected to the second external electronic device 205 through communication, the light-emitting means may be controlled to emit a specific color. For example, the light-emitting means may be controlled to emit a specific color according to a reproduction state of audio data (for example, reproducing or pause). For example, the light-emitting means may be controlled to emit a specific color according to user input generated through an input device.

The processor 290 may execute, for example, software to control at least one other element (for example, hardware or software element) of the first electronic device 201 connected to the processor 290 and process various pieces of data or calculations. According to an embodiment, as at least a portion of data processing or calculations, the processor 290 may load a command or data received from another element (for example, the sensor module 230 or the communication module 210) to the volatile memory 250, process the command or data stored in the volatile memory, and store resultant data in the nonvolatile memory.

According to an embodiment, the processor 290 may identify whether an electrical connection is established between the first electronic device 201 and the first external electronic device 204 through the sensor module 230 or the interface 280. The processor 290 may recognize a magnet installed in the first external electronic device 204 through a magnetic sensor (for example, hall sensor) included in the sensor module 230, so as to identify whether the electrical connection is established between the first electronic device 201 and the first external electronic device 204. The processor 290 may recognize the contact between the connection terminal included in the interface 280 and a connection terminal installed in a mounting part of the first external electronic device 204, so as to identify whether the electrical connection is established between the first electronic device 201 and the first external electronic device 204. According to an embodiment, the processor 290 may identify whether the first electronic device 201 is worn on ears through the sensor module 230.

According to certain embodiments, when the first electronic device 201 is connected to the second electronic device 202 through communication, the first electronic device 201 may be a master device and the second electronic device 202 may be a slave device. The first electronic device 201 corresponding to the master device may not only output an audio signal received from the second external electronic device 205 to the speaker 241 but also transmit the same to the second electronic device 202. When the first electronic device 201 is connected to the second electronic device 202 through communication, the first electronic device 201 may be a slave device and the second electronic device 202 may be a master device. According to certain embodiments, the second electronic device 202 may include modules which are the same as the modules included in the first electronic device 201.

According to certain embodiments, the first electronic device 201 may further include various modules according to a provision form thereof. Since such elements may be variously modified according to the trend toward convergence of digital devices, the elements cannot all be enumerated. However, the electronic device 201 may further include elements equivalent to the aforementioned elements. Further, in the first electronic device 201 according to an embodiment, specific elements may be excluded from the above elements or may be replaced with other elements according to a provision form thereof. This may be easily understood by those skilled in the art.

According to certain embodiments, the second electronic device 202 which forms a pair with the first electronic device 201 may include elements which are the same as those included in the first electronic device 201 and may perform operations which are the same as those of the first electronic device 201 described with reference to FIGS. 3 to 15 below.

Figure 3:
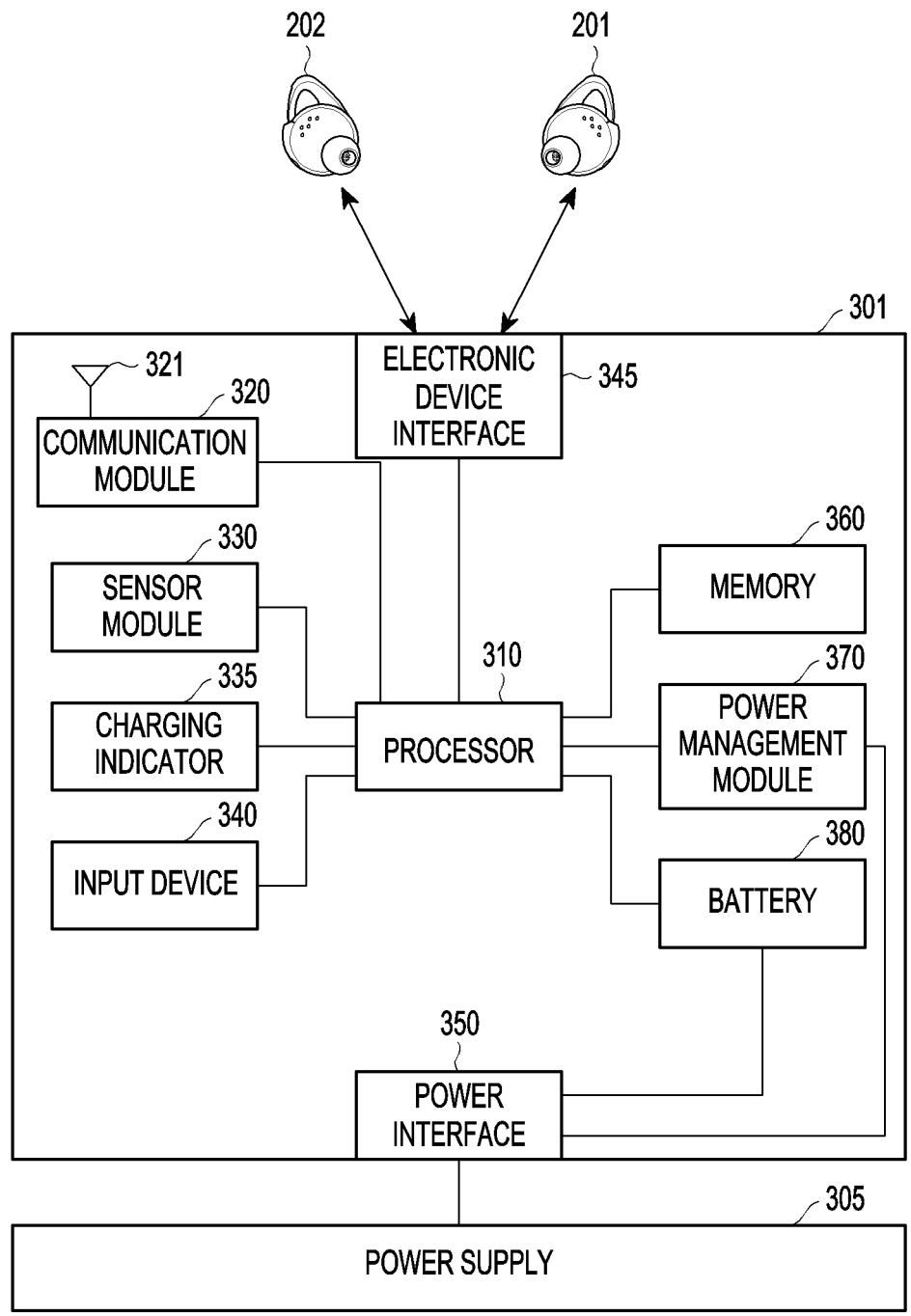
FIG. 3 is a block diagram illustrating a first external electronic device for storing at least one electronic device according to certain embodiments.

FIG. 3 is a block diagram of a first external electronic device 301 (for example, the first external electronic device 204 of FIG. 2) for storing at least one electronic device (for example, the first electronic device 201 and/or the second electronic device 202 of FIG. 2) according to certain embodiments.

According to certain embodiments, the first external electronic device 301 may be a case device for storing the first electronic device 201 and the second electronic device 202. The first external electronic device 301 may include a processor 310, an antenna 321, a communication module 320, a sensor module 330, at least one charging indicator 335, an input device 340, an electronic device interface 345, a power interface 350, a memory 360, a power management module 370, and a battery 380.

The processor 310 may execute, for example, software to control at least one other element (for example, hardware or software element) of the first external electronic device connected to the processor 310 and process various pieces of data or calculations. According to an embodiment, as at least a portion of data processing or calculations, the processor 310 may load a command or data received from another element (for example, the sensor module 330 or the communication module 220) to the volatile memory 360, process the command or data stored in the volatile memory, and store resultant data in the nonvolatile memory.

The communication module 320 may include a wireless communication module (for example, a cellular communication module, a wireless fidelity (Wi-Fi) communication module, a Bluetooth communication module, a near field communication (NFC) module, and a global navigation satellite system (GNSS) communication module) or a wired communication module (for example, a local area network (LAN) communication module or a power line communication module). Among the mobile communication modules, a corresponding communication module may communicate with at least one of the external electronic device (for example, the second external electronic device 205 of FIG. 2) (for example, portable terminal) or the electronic devices 201 and 202 through the first network (for example, the first network 198 of FIG. 1) or the second network (for example, the second network 199 of FIG. 1). The communication module 320 may operate independently from the processor 310 and may include one or more communication processors supporting direct (for example, wired) communication or wireless communication.

The antenna module 321 may transmit a signal or power to another electronic device (for example, the external electronic device (for example, the second external electronic device 205 of FIG. 2 or the electronic devices 201 and 202) or receive the same from another electronic device The antenna module 321 may include one antenna including a conductor configured on a substrate (for example, a PCB) or a radiator configured in a conductive pattern. According to an embodiment, the antenna module 321 may include a plurality of antennas. In this case, at least one antenna suitable for a communication scheme used for the communication network such as the first network (for example, the first network 198 of FIG. 1) or the second network (for example, the second network 199 of FIG. 2) may be selected by, for example, the communication module 210 from among the plurality of antennas. The signal or power may be transmitted or received between the communication module 320 and another electronic device through at least one selected antenna. it should be noted that an element (for example, RFIC) other than the radiator may be additionally configured as a portion of the antenna module 321.

According to certain embodiments, the antenna module 321 may include at least one of a coil for inducing a current by a magnetic field to wirelessly receive power from a power supply 305 or an external electronic device (for example, the second external electronic device 205 of FIG. 2), a resonator for generating a resonant phenomenon by a magnetic field having a specific resonance frequency, or a plurality of patch antennas for receiving electromagnetic waves.

According to certain embodiments, the antenna module 321 may include at least one of a coil for configuring a change in a magnetic field to wirelessly transmit power to the electronic devices 201 and 202, a resonator for configuring a magnetic field having a specific resonance frequency, and a plurality of patch antennas for transmitting electromagnetic waves.

The sensor module 330 may measure a physical quantity or detect an operation state of the first external electronic device 301. The sensor module 330 may convert measured or detected information into an electric signal. The sensor module 330 may include, for example, an acceleration sensor, a gyro sensor, a geomagnetic sensor, a magnetic sensor, a proximity sensor, a gesture sensor, a grip sensor, an optical sensor, or a biometric sensor. In operation, the sensor module 330 may detect whether one or more of the electronic devices 201 and 202 are located within the first external electronic device 301. According to an embodiment, the sensor module 330 may detect the case in which a cover of the first external electronic device 301 opens and the case in which the cover closes. The processor 310 may be electrically connected to the sensor module 330 and receive a signal indicating an open state and a closed state of the cover from the sensor module 330. The processor 310 may generate a signal for turning on the communication module (for example, the communication module 210 of FIG. 2) of the electronic devices 201 and 202 when one or more of the electronic devices 201 and 202 are located within the first external electronic device 301 and the cover switches from the closed state to the open state, and generate a signal for turning off the communication module (for example, the communication module 210 of FIG. 2) of the electronic devices 201 and 202 when one or more of the electronic devices 201 and 202 are located within the first external electronic device 301 and the cover switches from the open state to the closed state. According to an embodiment, when the cover is in the open state, the sensor module 330 may trigger the processor 310 to allow the electronic devices 201 and 202 and the external electronic device (for example, the second external electronic device 205 of FIG. 2) to enter a pairing mode.

At least one charging indicator 335 may display a charging level of the battery 380 and/or a battery (for example, the battery 270 of FIG. 2) of the electronic devices 201 and 202. The user may identify a charging amount of the battery 380 of the first external electronic device 301 or a charging amount of the battery (for example, the battery 270 of FIG. 2) of the electronic devices 201 and 202 through the charging indicator 335 on the surface of the first external electronic device 301. The charging indicator 335 may be implemented as a display or an LED.

The input device 340 may be configured to generate various input signals required for operating the first external electronic device 301. The input device 340 may include a touch pad, a touch panel, or a button. The touch pad may recognize a touch input based on at least one scheme among, for example, a capacitive scheme, a resistive scheme, an infrared scheme, and an ultrasonic scheme. When a capacitive touch pad is provided, physical contact or proximity recognition is possible. The touch pad may further include a tactile layer. The touch pad including the tactile layer may provide tactile reaction to a user. The button may include, for example, a physical button or an optical key.

The electronic device interface 345 may support one or more predetermined protocols which can be used to directly or wirelessly connect the first external electronic device 301 to the electronic devices 201 and 202. According to an embodiment, the electronic device interface 345 may include, for example, a high-definition multimedia interface (HDMI), a universal serial bus (USB) interface, an SD card interface, or an audio interface. According to an embodiment, the interface 345 may include a connection terminal for configuring a physical connection with the electronic devices 201 and 202. In operation, the processor 310 may identify whether the physical connection is established between the first external electronic device 301 and the electronic devices 201 and 202 through the electronic device interface 345. According to an embodiment, when the processor 310 identifies the physical contact between the first external electronic device 301 and the electronic devices 201 and 202 through the electronic device interface 345, the processor 310 may generate a charging signal that initiates charging of the electronic devices 201 and 202. The processor 310 may identify removal of one or two of the electronic devices 201 and 202 from the first external electronic device 301 through the electronic device interface 345 and may generate a removal signal that stops charging the removed electronic devices 201 and/or 202.

The power interface 350 may support one or more predetermined protocols which can be used to directly or wirelessly connect the first external electronic device 301 to the power supply 305 or the external electronic device (for example, the second external electronic device 205 of FIG. 2). The power interface 350 according to an embodiment may include some of a USB connector, a lightning connector, or a receptacle connector for another connector capable of providing power to the first external electronic device 301. The power interface 350 according to an embodiment may adopt the structure including an antenna 321 for wirelessly receiving power from the power supply 305 or the external electronic device (for example, the second external electronic device 205 of FIG. 2).

The memory 360 may store various pieces of data used by at least one element (for example, processor 310 or sensor module 330) of the first external electronic device 301. The data may include, for example, software and input data or output data related thereto. The memory 360 may include volatile memory or non-volatile memory.

According to certain embodiments, the memory 360 may store configuration information related to the Bluetooth communication connection. The configuration information may include at least one piece of first Bluetooth address information, second Bluetooth address information, or identification information of the first external electronic device 301. According to an embodiment, the first Bluetooth address information or the second Bluetooth address information may include a Bluetooth device address (for example, BD_ADDR) or LE address information generated on the basis of the Bluetooth device address. According to an embodiment, the first Bluetooth address information or the second Bluetooth address information may further include a device type indicating one of a right earbud or a left earbud. According to an embodiment, the first Bluetooth address information or the second Bluetooth address information may further include device type information indicating one of a master device or a slave device. According to an embodiment, the first Bluetooth address information and the second Bluetooth address information may include different Bluetooth device addresses and device type information. The configuration information related to the Bluetooth communication connection may further include identification information of the first external electronic device 301. According to an embodiment, the identification information of the first external electronic device 301 may include communication address information of the first external electronic device 301 (for example, MAC address or Bluetooth address) or include unique identification information such as a serial number configured by a manufacturer of the first external electronic device 301. Identification information 813 of the first external electronic device 301 is not limited thereto and may include information in various formats for identifying the first external electronic device 301.

According to certain embodiments, the memory 360 may store information on the use of at least one of a near field communication (NFC) tag, a radio frequency identification (RFID) tag, a magnetic secure transmission (MST) device, a quick response (QR) code, or a bar code. According to certain embodiments, at least one of the NFC tag, the RFID tag, the MST device, the QR code, or the bar code may be included in the first external electronic device 301 or the elements of the first external electronic device 301 illustrated in FIG. 3, or may be implemented as separate elements within the first external electronic device 301. At least one of the NFC tag, the RFID tag, the MST device, the QR code, or the bar code may store at least one piece of first Bluetooth address information, second Bluetooth address information, or identification information of the first external electronic device 301.

The power management module 370 may manage power supplied to the first external electronic device 201. According to an embodiment, the power management module 370 may be implemented as, for example, at least a part of a power management integrated circuit (PMIC). According to an embodiment, the power management module 370 may include a battery charging module. The power management module 370 may wirelessly or wiredly receive power from the power supply 305 or the external electronic device (for example, the second external electronic device 205 of FIG. 2) according to the control of the processor 310 and charge the battery 380. According to an embodiment, the power management module 370 may wirelessly or wiredly provide power of the battery 380 to the electronic devices 201 and 202 through the electronic device interface 345 or the antenna 321 according to the control of the processor 310.

The battery 380 may supply power to at least one element of the first external electronic device 301. According to an embodiment, the battery 380 may include, for example, non-rechargeable primary cell, a rechargeable secondary cell, or a fuel cell.

According to certain embodiments, the first electronic device 201 may identify at least one piece of first Bluetooth address information, second Bluetooth address information, or identification information of the first external electronic device 301 stored in at least one of the memory 360, the NFC tag, the RFID tag, the MST device, the QR code, or the bar code in the first external electronic device 301 through the communication module (for example, the communication module 210 of FIG. 2) or the sensor module (for example, the sensor module 230 of FIG. 2).

According to certain embodiments, the first external electronic device 301 may further include various modules according to a provision form thereof. Since such elements may be variously modified according to the trend toward convergence of digital devices, the elements cannot all be enumerated. However, the first external electronic device 301 may further include elements equivalent to the aforementioned elements. Further, in the first electronic device 201 according to an embodiment, specific elements may be excluded from the above elements or may be replaced with other elements according to a provision form thereof. This may be easily understood by those skilled in the art.

Figure 4:
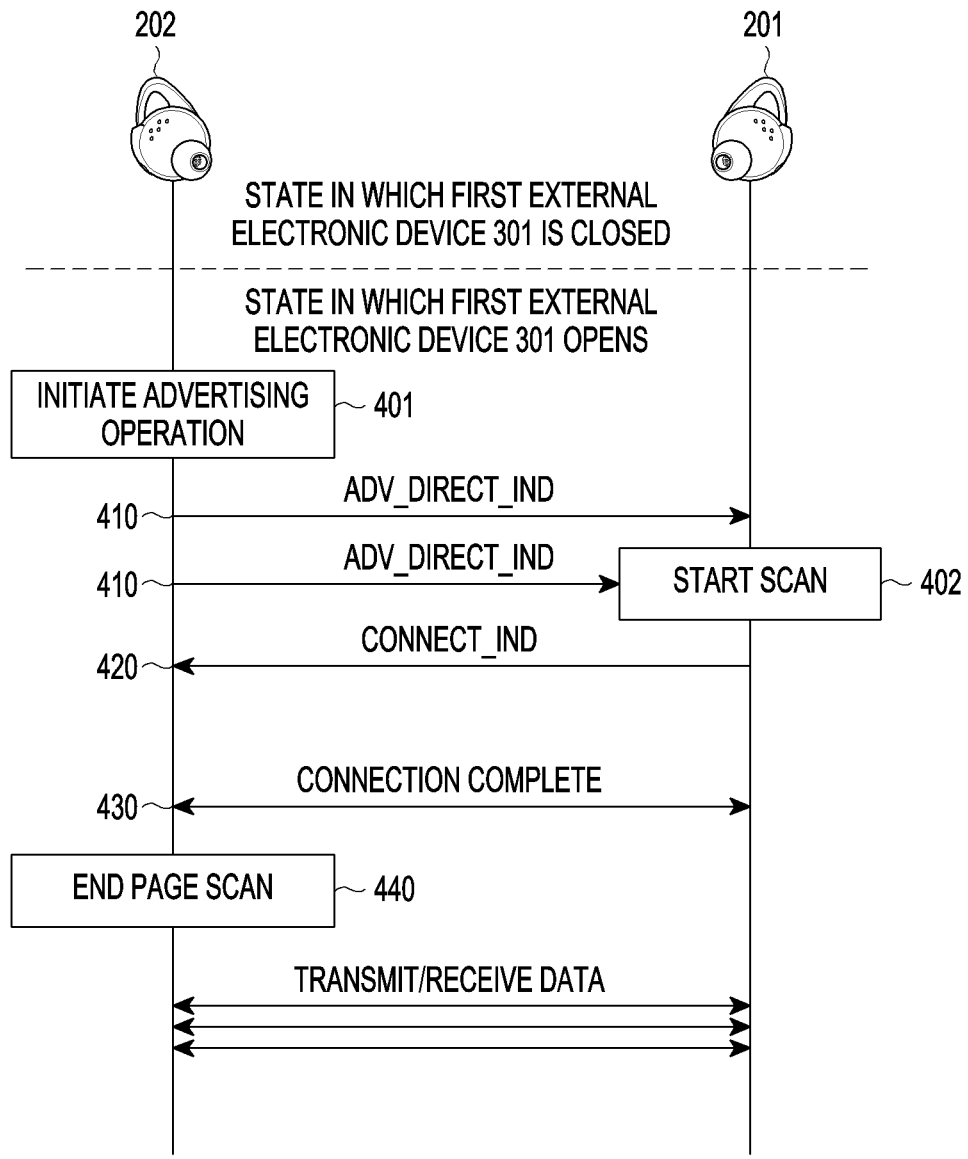
FIG. 4 illustrates an embodiment in which a first electronic device makes a BLE communication connection with a second electronic device according to certain embodiments.

FIG. 4 illustrates an embodiment in which the first electronic device 201 establishes a Bluetooth low energy (BLE) communication connection with the second electronic device 202 according to certain embodiments.

Referring to FIG. 4, the first electronic device 201 according to certain embodiments may operate as a master device during Bluetooth low energy (BLE) communication, and the second electronic device 202 may operate as a slave device. According to an embodiment, the first electronic device 201 or the second electronic device 202 may detect an event for activating the communication module (for example, the communication module 210 of FIG. 2) or power from the first external electronic device 301 (for example, case device). For example, the first electronic device 201 or the second electronic device 202 may identify switching of the cover of the first external electronic device 301 (for example, case device) from the closed state to the open state. The first electronic device 201 or the second electronic device 202 may switch its own communication module (for example, communication module 210 of FIG. 2) from the turned-off state to the turned-on state on the basis of identification of switching of the cover of the first external electronic device 301 from the closed state to the open state. According to an embodiment, the first electronic device 201 or the second electronic device 202 may switch its own communication module (for example, communication module 210 of FIG. 2) from the turned-off state to the turned-on state on the basis of acquisition of a signal indicating switching of the cover of the first external electronic device 301 from the closed state to the open state from the first external electronic device 301.

According to certain embodiments, the first electronic device 201 may make a communication connection with the second electronic device 202 on the basis of a first connection scheme or a second connection scheme. The first connection scheme may include a passive scan scheme of a BLE communication protocol, and the second connection scheme may include an active scan scheme of the BLE communication protocol.

According to certain embodiments, the second electronic device 202 may initiate an advertising operation or a page scan operation for broadcasting or multicasting an advertising signal 410 (for example, ADV_DIRECT_IND) at predetermined intervals on the basis of the first connection scheme or the second communication scheme in operation 401. For example, the advertising signal 410 may include at least one piece of address information of the second electronic device 202, user account information, information indicating the existence of nonexistence of current pairing with another device, information on devices which can be paired at the same time, transmission power, a detection area, or information on the remaining battery. According to an embodiment, the advertising signal 410 may include identification information of the first external electronic device 301 in a manufacture data field. In operation, the second electronic device 202 may broadcast or multicast the advertising signal on the basis of identification of switching of the cover of the first external electronic device 301 from the closed state to the open state. According to an embodiment, the second electronic device 202 may perform the advertising operation 401 for broadcasting or multicasting the advertising signal 410 on the basis of identification of release of the electrical connection wiredly or wirelessly configured with the first external electronic device 301. For example, the second electronic device 202 may perform the advertising operation 401 for broadcasting or multicasting the advertising signal 410 on the basis of identification of separation of the second electronic device 202 from the connection terminal of the first external electronic device 301.

According to certain embodiments, the first electronic device 201 may perform a scan operation 402 on the basis of the first connection scheme or the second connection scheme in order to search for the second electronic device 202. According to an embodiment, the first electronic device 201 may perform the scan operation 402 on the basis of identification of switching of the cover of the first external electronic device 301 from the closed state to the open state. According to an embodiment, the first electronic device 201 may perform the scan operation 402 on the basis of identification of release of the electrical connection wiredly or wirelessly configured with the first external electronic device 301. For example, the first electronic device 201 may perform the scan operation 402 on the basis of identification of separation of the first electronic device 201 from the connection terminal of the first external electronic device 301.

According to certain embodiments, the first electronic device 201 may acquire the advertising signal 410 from the second electronic device 202. According to an embodiment, the first electronic device 201 may transmit a connection request signal 420 (for example, CONNECT_IND) to the second electronic device 202 according to the first connection scheme (for example, BLE passive scan scheme) on the basis of acquisition of the advertising signal 410. According to an embodiment, the first electronic device 201 may transmit a scan request signal (not shown) to the second electronic device 202 according to the second connection scheme (for example, BLE active scan scheme) on the basis of acquisition of the advertising signal 410 and acquire a scan response signal corresponding to the scan request from the second electronic device 202. According to an embodiment, the first electronic device 201 may transmit the connection request signal 420 to the second electronic device 202 according to the second connection scheme on the basis of acquisition of the scan response signal (not shown). According to an embodiment, the first electronic device 201 may identify local address information (for example, local address information 831 of FIG. 8) of the second electronic device 202 included in the advertising signal 410 or the scan response signal (not shown).

According to certain embodiments, the first electronic device 201 may transmit the connection request signal 420 (for example, CONNECT_IND) to the second electronic device 202 on the basis of identification that the local address information of the second electronic device 202 corresponds to peer address information (for example, peer address information 822 of FIG. 8.) configured in the first electronic device 201. The connection request signal 420 is local address information within the first electronic device 201 and may include the configured Bluetooth address information of the first electronic device 201. The first electronic device 201 may complete the BLE communication connection with the second electronic device 202 on the basis of transmission of the connection request signal 420 to the second electronic device 202 in operation 430, and the second electronic device 202 may complete the BLE communication connection with the first electronic device 201 on the basis of reception of the connection request signal 420 from the first electronic device 201 in operation 430. The first electronic device 201 and the second electronic device 202 may transmit and receive data to and from each other through an established communication channel. According to an embodiment, the second electronic device 202 may end the page scan operation in operation 440 after completing the communication connection with the first electronic device 201 in operation 430.

Figure 5:
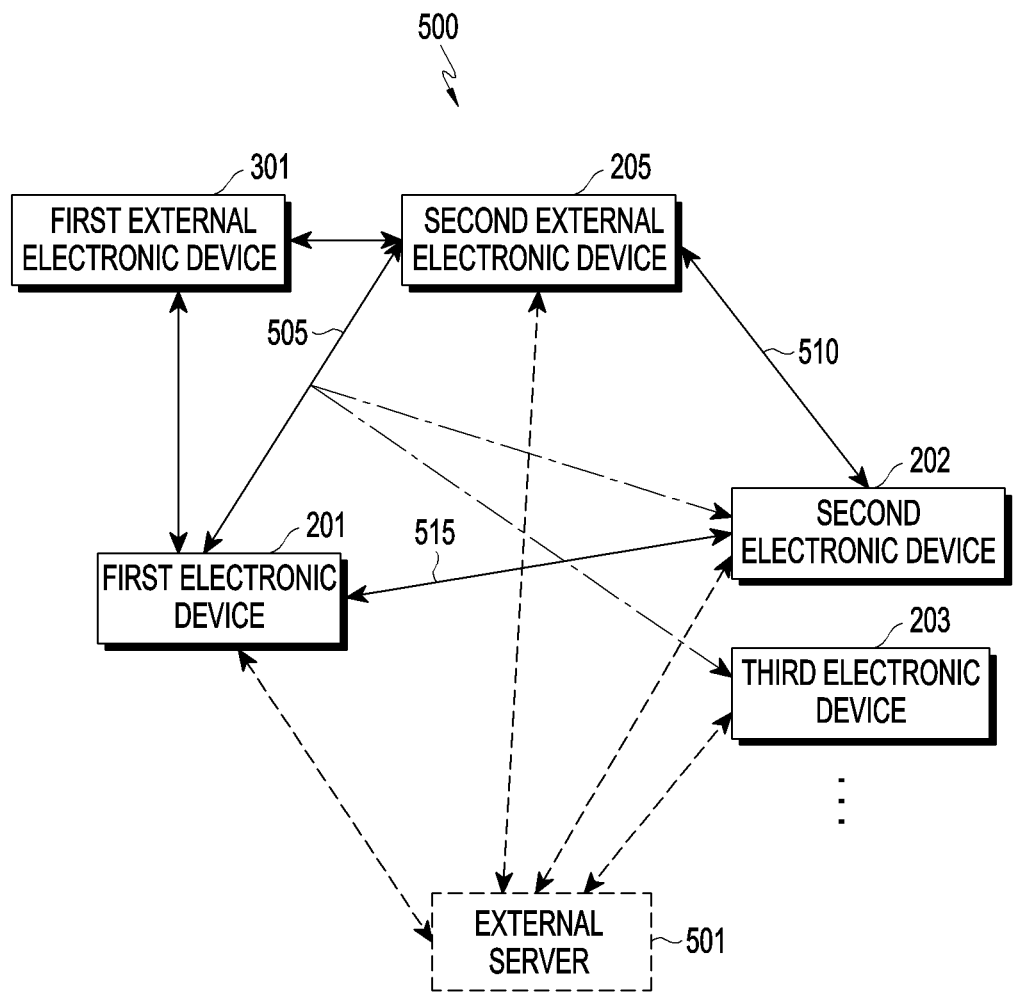
FIG. 5 illustrates a topology of a Bluetooth network environment according to certain embodiments.

FIG. 5 illustrates a topology 500 in a Bluetooth network environment according to certain embodiments.

Referring to FIG. 5, devices (for example, 201, 202, 203, 205, and 301 of FIG. 3) included in the topology 500 may include elements which are at least partially the same as or similar to the electronic device 101 illustrated in FIG. 1, and at least some thereof may perform the same or similar function. For example, the devices (for example, 201, 202, 203, 205, and 301) may perform wireless communication in a short range according to the Bluetooth network defined by Bluetooth SIG. The Bluetooth network may include, for example, a Bluetooth legacy network and a Bluetooth low energy (BLE) network. According to an embodiment, the devices (for example, 201, 202, 203, 205, and 301) may perform wireless communication through one of the Bluetooth legacy network and the BLE network or perform wireless communication through the two networks.

According to an embodiment, the first electronic device 201, the second electronic device 202, and the third electronic device 203 may be a device configured to output media data (for example, audio signal). For example, the first electronic device 201, the second electronic device 202, and the third electronic device 203 may include a wireless earphone, a wireless speaker, or a wireless earbud.

According to an embodiment, the first external electronic device 301 may be a case device for storing or charging the first electronic device 201 and the second electronic device 202. According to an embodiment, the first external electronic device 301 may include the first external electronic device 204 illustrated in FIG. 2. Meanwhile, although FIG. 5 illustrates that the first external electronic device 301 transmits and receives a signal to and from the first electronic device 201 or the second electronic device 205, it is only an example and the first external electronic device 301 may transmit and receive a signal to and from the second electronic device 202, the third electronic device 203, or an external server 501.

According to an embodiment, the second external electronic device 205 may operate as a data source device. The second external electronic device 205 may be an electronic device transmitting media data such as music to another electronic device connected to the second external electronic device 205. For example, the second external electronic device 205 may include a user terminal such as a smart phone, a tablet, a desktop computer, or a laptop computer.

According to an embodiment, the second external electronic device 205 may be connected to one or more external devices (for example, the first electronic device 201, the second electronic device 202, and/or the third electronic device 203) on the basis of the Bluetooth communication protocol. For example, the second external electronic device 205 may be connected to an external device through exchange of information with the external device according to a predetermined sequence. When the connection to a plurality of external electronic devices is made, the second external electronic device 205 may perform the connection operation with each of the plurality of external devices.

For example, the second external electronic device 205 may recognize the first electronic device 201 through wireless communication (for example, Bluetooth (for example, Bluetooth legacy and/or BLE)). The second external electronic device 205 may recognize the first electronic device 201 by receiving the advertising signal broadcasted or multicasted by the first electronic device 201. For example, the first electronic device 201 may transmit the advertising signal including information related to the connection or the connection request. For example, the advertising signal may include at least one piece of address information of the first electronic device 21, user account information, information indicating whether the existence of nonexistence of current pairing with another device, information on devices which can be paired at the same time, transmission power, a detection area, or information on the remaining battery. According to an embodiment, the advertising signal may include identification information of the first external electronic device 301 acquired by the first electronic device 201 from the first external electronic device 301 in a manufacture data field. The second external electronic device 205 may perform the connection operation on the basis of the Bluetooth or BLE protocol with the recognized first electronic device 201. For example, the second external electronic device 205 may recognize the first electronic device 201 on the basis of the Bluetooth and/or BLE protocol and perform the connection operation with the first electronic device 201 on the basis of the Bluetooth or BLE protocol.

According to an embodiment, when receiving the advertising signal, the second external electronic device 205 may output a user interface for the connection with the first electronic device 201 on a display. For example, the user interface may include address information of the identified device (for example, the first electronic device 201). For example, the user interface may include an indicator indicating whether the identified device has been previously paired with the second external electronic device 205. For example, the user interface may include information on the user account associated with the second external electronic device 205 and/or the first electronic device 201.

For example, when receiving a user input (e.g., Bluetooth function activation input), the second external electronic device 205 may identify another electronic device and provide identified electronic device information to the user. The second external electronic device 205 may make the connection with an external electronic device (e.g., the first electronic device 201) on the basis of a user input (e.g., input for selecting a connection device) for at least one of the identified electronic devices. For example, the second external electronic device 205 may transmit a connection request to the selected first electronic device 201 and, when receiving an acceptance response from the first electronic device 201, may be connected to the first electronic device 201.

According to an embodiment, when the connection to the first electronic device 201 is made, the second external electronic device 205 may transmit information related to the first electronic device 201 to an external server 501 (example.e., Internet-of-things (IoT) server or a Samsung Connect™ server). For example, when the second external electronic device 205 is first connected to the first electronic device 201 among other external electronic devices linked to the account of the second external electronic device 205, the second external electronic device 205 may register information on the connected first electronic device 201 to the external server 501. In another example, when the second external electronic device 205 has been previously connected to the first electronic device 201, the second external electronic device 205 may transmit state information associated with the first electronic device 201 and/or a first link 505 to the external server 501. For example, the second external electronic device 205 may manage other electronic devices on the basis of the account (e.g., user account associated with the second external electronic device 205) by using information on the external server 501. According to an embodiment, the second external electronic device 205 may store information on the connected device (e.g., first electronic device 201) and/or the link (e.g., first link 505) in the memory. For example, the second external electronic device 205 may store or update the information on the first electronic device 201 in the memory.

According to an embodiment, the second external electronic device 205 may receive information on another electronic device from the external server 501. For example, the second electronic device 202 may be connected to the first electronic device 201 through a third link 515 and may transmit information on the first electronic device 201 to the external server 501. The second external electronic device 205 may receive the information on the first electronic device 201 transmitted by the second electronic device 202 from the external server 501. For example, the second external electronic device 205, the first electronic device 201, and the second electronic device 202 may be electronic devices associated with the same account in the external server 501.

According to an embodiment, the second external electronic device 205 may transmit data to the connected external device. For example, the second external electronic device 205 may transmit data to the first electronic device 201 through the first link 505. The second external electronic device 205 or the first electronic device 201 may be configured as a master device in the connection procedure. For example, in the case of legacy Bluetooth communication, the second external electronic device 205 may transmit data through channel resources (e.g., frequency hopping channel) generated on the basis of a clock of the master device of the first link 505. In another example, in the case of BLE communication, the second external electronic device 205 may transmit data to the first electronic device 201 in every connection interval. According to an embodiment, the first electronic device 201 may receive data from the second external electronic device 205 through the first link 505. For example, the first electronic device 201 may transmit acknowledgement (ACK)/negative ACK (HACK) to the second external electronic device 205 on the basis of at least some of the data received through the first link 505. The first electronic device 201 may transmit ACK/NACK to the second external electronic device 205 through the first link 505.

According to an embodiment, the second external electronic device 205 may configure only the first link 505 with the first electronic device 201 and transmit a data packet through the first link 505. For example, in order to receive/listen a data packet transmitted from the second external electronic device 205 to the first electronic device 201 through the first link 501, at least one other electronic device (e.g., the second electronic device 202 and/or the third electronic device 203) may monitor the first link 505. In this case, the second external electronic device 205 unicasts data to the first electronic device 201, but the data transmitted by the second external electronic device 205 may be received not only by the first electronic device 201 but also by another electronic device (e.g., second electronic device 202 and/or the third electronic device 203).

Hereinafter, it is described that the second electronic device 202 monitors the first link 505, but embodiments of this document are not limited thereto. Another electronic device (i.e., third electronic device 203) may monitor the first link 505 through a method similar to the method by which the second electronic device 202 monitors the first link 505.

According to an embodiment, the second external electronic device 205 may be connected to the second electronic device 202 on the basis of the Bluetooth protocol. For example, the second external electronic device 205 and the second electronic device 202 may be connected through the second link 510. The second external electronic device 205 may transmit information on the first link 505 to the second electronic device 202 through the second link 510. When receiving, for example, the information on the first link 505, the second electronic device 202 may transmit ACK/NACK for reception of the information on the first link 505 to the second external electronic device 205 through the second link 510. For example, the information on the first link 505 may include information on the first link 505 for receiving data transmitted by the second electronic device 202 through the first link 505. For example, the information on the first link 505 may include address information (for example, a Bluetooth address of a master device of the first link 505, a Bluetooth address of the second external electronic device 205, and/or a Bluetooth address of the first electronic device 201), piconet clock information (for example, clock native (CLKN) of the master device of the first link 505), logical transport address information (for example, information allocated by the master device of the first link 505), used channel map information, link key information, service discovery protocol (SDP) information (for example, service and/or profile information associated with the first link 505), and/or supported feature information. The information on the first link 505 may further include, for example, an extended inquiry response (EIR) packet. The EIR packet may include resource control information of the first link 505 and/or information on a manufacturer. According to an embodiment, the EIR packet may include identification information of the first external electronic device 301 acquired from the first external electronic device 301 by the first electronic device 201.

According to an embodiment, the second electronic device 202 may receive (for example, listen) communication between the second external electronic device 205 and the first electronic device 201 through the first link 505 by using the information on the first link 505. For example, the second electronic device 202 may determine a hopping channel (or frequency hopping channel) of the first link 505 on the basis of the information on the first link 505 and decrypt an encrypted data packet through key information.

According to an embodiment, the first electronic device 201 may transmit a response message to the second external electronic device 205 in order to notify of normal reception of the data packet. The response message may include a positive acknowledgement (ACK) message indicating that the data packet is normally received and a negative acknowledgement (NACK) message indicating that the data packet is not normally received. The response message may include, for example, 1-bit information. When the ACK message is received after the data packet is transmitted, the second external electronic device 205 may transmit the next data packet. When the NACK message is received or a response message is not received within a predetermined time, the second external electronic device 205 may retransmit the same data packet.

According to an embodiment, the first electronic device 201 may transmit the response message to the second external electronic device 205 on the basis of ACK/NACK received from the second electronic device 202. For example, the second electronic device 202 may monitor the data packet transmitted by the second external electronic device 205 through the first link 505 and transmit a reception result of the transmitted data packet to the first electronic device 201 through the third link 515. For example, the second electronic device 202 may transmit ACK to the first electronic device 201 through the third link 515 when the data packet is successfully received from the second external electronic device 205, and transmit NACK to the first electronic device 201 through the third link 515 when the data packet is not successfully received. When NACK is received from the second electronic device 202, the first electronic device 201 may transmit a response message including NACK to the second external electronic device 205 through the first link 505. When the data is not successfully received from the second external electronic device 205, the first electronic device 201 may transmit a response message including NACK to the second external electronic device 205 through the first link 505. Only when the first electronic device 201 may successfully receive data from the second external electronic device 205 and receives ACK for the corresponding data from the second electronic device 202, the first electronic device 201 may transmit the response message including ACK to the second external electronic device 205 through the first link 505.

According to an embodiment, the second electronic device 202 may transmit the response message to the second external electronic device 205 on the basis of ACK/NACK from the first electronic device 201. For example, the first electronic device 201 may transmit the reception result of the data packet transmitted through the first link 505 to the second electronic device 202 through the third link 515. For example, the first electronic device 201 may transmit ACK to the second electronic device 202 through the third link 515 when the data packet is successfully received from the second external electronic device 205, and transmit NACK to the second electronic device 202 through the third link 515 when the data packet is not successfully received. In another example, the first electronic device 201 may not transmit ACK to the second electronic device 202 when the packet is not successfully received. When NACK is received or ACK is not received from the first electronic device 201, the second electronic device 202 may transmit the response message including NACK to the second external electronic device 205 through the second link 510. When the data is not successfully received from the second external electronic device 205, the second electronic device 202 may transmit the response message including NACK to the second external electronic device 205 through the second link 510. Only when the second electronic device 202 successfully receives data from the second external electronic device 205 and receives ACK for the corresponding data from the first electronic device 201, the second electronic device 202 may transmit the response message including ACK to the second external electronic device 205 through the second link 510.

According to an embodiment, the first electronic device 201 and the second electronic device 202 may transmit ACK/NACK at different timings. For example, the first electronic device 201 and the second electronic device 202 may be configured to transmit ACK/NACK for data from the second external electronic device 205 at different timings within one time interval (for example, slot or time interval). The first electronic device 201 and the second electronic device 202 may transmit ACK/NACK to the second external electronic device 205 using different sub slots among a plurality of sub slots included in one slot. The first electronic device 201 and the second electronic device 202 may transmit ACK/NACK at timings that do not overlap each other within one time interval (for example, time interval configured for data transmission). For example, the first electronic device 201 and the second electronic device 202 may transmit ACK/NACK through the first link 505 or the second link 510.

According to an embodiment, the second electronic device 202 may transmit NACK in a time margin interval (for example, Rx cycle) configured on the basis of a gap between slots. For example, when reception of data from the second external electronic device 205 is successful, the second electronic device 202 may not transmit ACK and NACK within the time margin interval. In this case, the first electronic device 201 may transmit ACK to the second external electronic device 205 through the first link 505 after the time margin interval passes. In another example, when reception of data from the second external electronic device 205 fails, the second electronic device 202 may transmit NACK to the second external electronic device 205 within the time margin interval. Accordingly, only when data is not successfully received from the second external electronic device 205, the second electronic device 202 may transmit NACK to the second external electronic device 205 ahead of the first electronic device 201.

According to an embodiment, types of the response messages associated with the first link 505 and the second link 510 may be different. For example, when data from the second external electronic device 205 is successfully received, the first electronic device 201 may transmit ACK to the second electronic device 202. In this case, the second electronic device 202 may receive ACK from the first electronic device 201 and, when data from the second external electronic device 205 is successfully received, may transmit a message (for example, message corresponding to ACK) to the second external electronic device 205 through the second link 510. In another example, when the second electronic device 202 has received ACK from the first electronic device 201 but fails in receiving data from the second external electronic device 205, the second electronic device 202 may transmit no response to the second external electronic device 205. In another example, when the first electronic device 201 fails in receiving data from the second external electronic device 205, the first electronic device 201 may transmit a message (for example, message corresponding to NACK) to the second external electronic device 205 through the first link 505. In this case, the second electronic device 202 may transmit no response to the second external electronic device 205. Accordingly, the second external electronic device 205 may receive only the message associated with ACK through the second link 510 and receive only the message associated with NACK through the first link 505. When no response is received from the first electronic device 201 (for example, no response), the second external electronic device 205 may recognize the case corresponding to NACK.

According to an embodiment, the first electronic device 201 and the second electronic device 202 may alternately transmit ACK/NACK. For example, ACK/NACK for first data from the second external electronic device 205 may be transmitted by the first electronic device 201, and ACK/NACK for the following second data may be transmitted by the second electronic device 202. For example, a device (for example, the first electronic device 201 or the second electronic device 202) configured to transmit ACK/NACK may collect ACK/NACK from another device (for example, the second electronic device 202 or the first electronic device 201) and transmit ACK/NACK to the second external electronic device 205.

According to an embodiment, the first electronic device 201 and the second electronic device 202 may transmit ACK/NACK using different powers through the same link (for example, first link 505). For example, the first electronic device 201 may transmit ACK/NACK to the second external electronic device 205 by using higher transmission power than the second electronic device 202. The second external electronic device 205 may not receive ACK/NACK of the second electronic device 202. In another example, the second electronic device 202 may transmit ACK/NACK to the second external electronic device 205 by using higher transmission power than the first electronic device 201. The second external electronic device 205 may not receive ACK/NACK of the first electronic device 201. For example, lower transmission power among transmission powers of the first electronic device 201 and the second electronic device 202 may be transmission power that cannot be received by the second external electronic device 205. In another example, lower transmission power among transmission powers of the first electronic device 201 and the second electronic device 202 may be transmission power that cannot be received by the second external electronic device 205 and can be received by the other device (for example, first electronic device 201 or the second electronic device 202).

According to certain embodiments, when the first electronic device 201 and/or the second electronic device 202 fail in data reception from the second external electronic device 205, the data cannot be retransmitted. In operation, the second external electronic device 205 may retransmit data in response to reception of NACK or non-reception of ACK. The first electronic device 201 or the second electronic device 202 may perform retransmission. For example, when the first electronic device 201 receives data from the second external electronic device 205 but the second electronic device 202 fails in data reception, the first electronic device 201 may retransmit data to the second electronic device 202 through the third link 515. In another example, when the second electronic device 202 receives data from the second external electronic device 205 but the first electronic device 201 fails data reception, the second electronic device 202 may retransmit data to the first electronic device 201 through the third link 515.

According to an embodiment, the second external electronic device 205 or the second electronic device 202 may release the connection of the second link 510 after transmitting information on the first link 505. According to another embodiment, the second external electronic device 205 or the second electronic device 202 may maintain the connection of the second link 505 even after transmitting the information on the first link 505.

According to certain embodiments, when the second electronic device 202 and the third electronic device 203 are inserted into the case device (for example, the first external electronic device 301 of FIG. 2) in the state in which the first electronic device 210 is connected to the second electronic device 202 as a pair, the first electronic device 201 may receive a signal corresponding thereto from the second electronic device 202 and output a sound corresponding to the received signal through the speaker 241.

In the above-described examples, the information on the first link 505 may be transmitted to the second electronic device 202 by the second external electronic device 205. A device having the information on the first link 505 may monitor (for example, listen) information transmitted and received through the first link 505. Accordingly, in order to prevent an unwanted device from listening the first link 505, the second external electronic device 205 may carefully determine whether to share the information on the first link 505. Hereinafter, methods of sharing the information on the first link 505 according to certain embodiments may be described. As described above, the methods of sharing the information on the first link 505 may be similarly applied to other electronic devices (for example, the third electronic device 203). Further, the first electronic device 201 and the second electronic device 202 are divided only for convenience of description, and embodiments of this document are not limited thereto. For example, the first electronic device 201 may execute embodiments of this document related to the second electronic device 202. The second electronic device 202 may execute embodiments of this document related to the first electronic device 201.

Figure 6A:
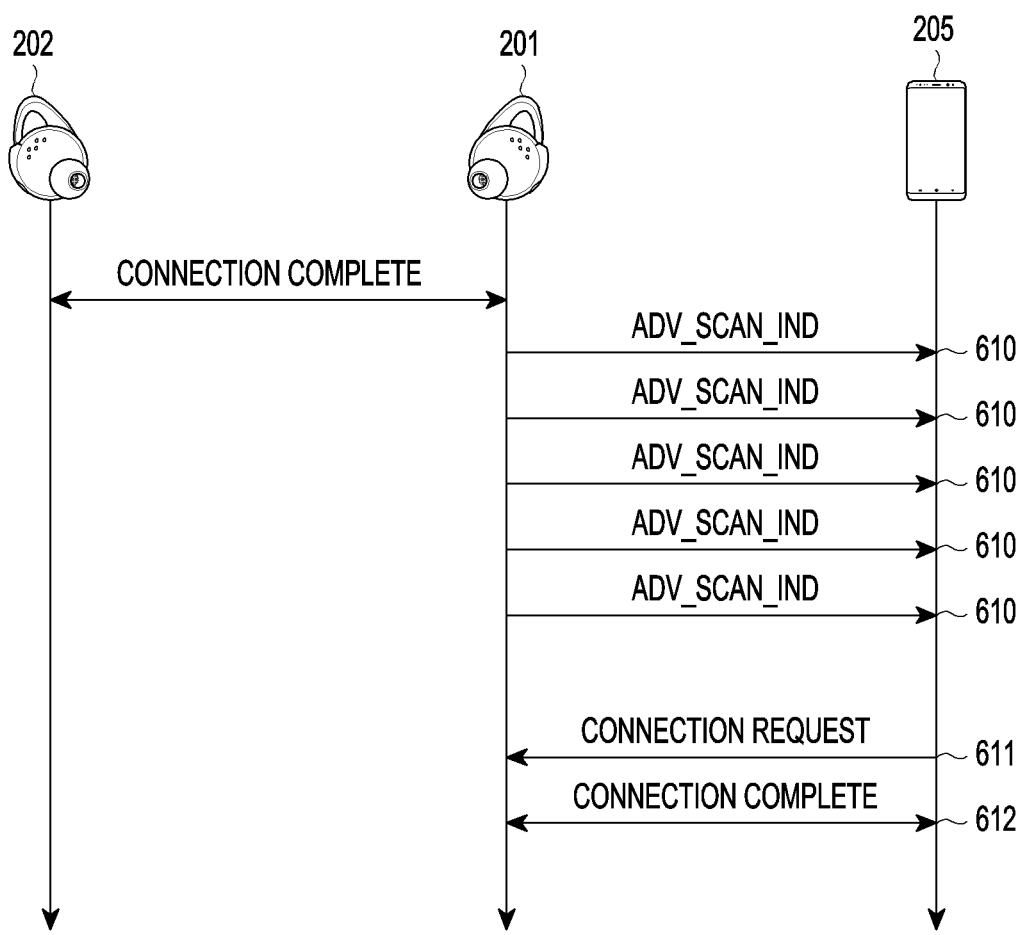
FIG. 6A illustrates an embodiment in which a first electronic device makes anew communication connection with a second external electronic device according to certain embodiments.

FIG. 6A illustrates an embodiment in which the first electronic device 201 makes a new communication connection with the second external electronic device 205 according to certain embodiments.

The first electronic device 201 in FIGS. 6A to 6C described below may operate as a master device and the second device 202 may operate as a slave device. According to certain embodiments, roles of the first electronic device 201 and the second electronic device 202 are not fixed, and the first electronic device 201 may operate as the slave device and the second electronic device 202 may operate as the master device. In this case, operations performed by the first electronic device 201 may be performed by the second electronic device 202, and operations performed by the second electronic device 202 may be performed by the first electronic device 201.

Referring to FIGS. 4 and 6A, the first electronic device 201 may complete the communication connection with the second electronic device 202 as illustrated in FIG. 4. According to an embodiment, the first electronic device 201 may transmit an advertising signal 610 (for example, ADV_SCAN_IND). According to an embodiment, the advertising signal may include at least one piece of address information of the first electronic device 201, user account information, information indicating the existence or non-existence of current pairing with another device, information on devices which can be paired at the same time, transmission power, a detection area, or information on the remaining battery. The second external electronic device 205 may perform the connection operation on the basis of the Bluetooth or BLE protocol with the recognized first electronic device 201. For example, the second external electronic device 205 may transmit a connection request signal 611 (e.g., connection request) to the first electronic device 201 on the basis of reception of the advertising signal from the first electronic device 201. The second external electronic device 205 may complete the communication connection with the first electronic device 201 on the basis of transmission of the connection request signal. The first electronic device 201 may complete the communication connection with the second external electronic device 205 on the basis of reception of the connection request signal from the second external electronic device 205 in operation 612.

Figure 6B:
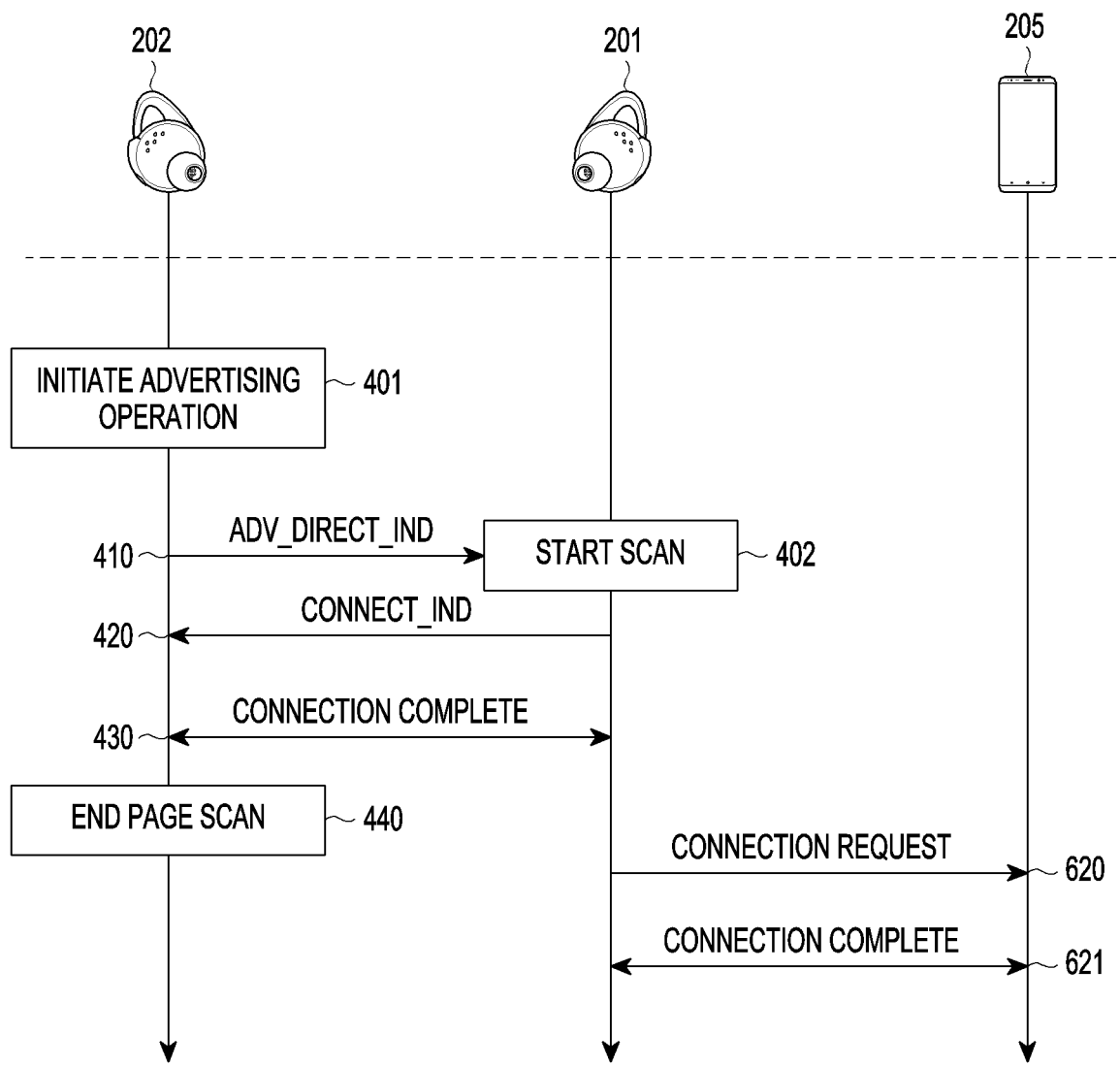
FIG. 6B illustrates an embodiment in which a first electronic device makes a communication connection with a second electronic device and a second external electronic device according to certain embodiments.

FIG. 6B illustrates an embodiment in which the first electronic device 201 makes a communication connection with the second electronic device 202 and the second external electronic device 205 according to certain embodiments.

Referring to FIGS. 4 and 6B, the first electronic device 201 may complete the communication connection with the second electronic device 202 as illustrated in FIG. 4. According to an embodiment, the first electronic device 201 may perform the connection operation on the basis of a Bluetooth or BLE protocol in order to make the communication connection with the second external electronic device 205 which has been previously connected. In operation, when the cover of the first external electronic device 301 switches from the closed state to the open state, the first electronic device 201 may perform the paging operation to the second external electronic device 205 on the basis of elapse of a predetermined first time (for example, 1 second) from the time point at which the state of the cover switches. For example, the first electronic device 201 may transmit a connection request signal 620 (for example, connection request) to the second external electronic device 205. The second external electronic device 205 may complete the communication connection with the first electronic device 201 on the basis of reception of the connection request signal from the first electronic device 201 in operation 621. According to an embodiment, when the second electronic device 202 is the master device, the second electronic device 202 may perform the paging operation to the second external electronic device 205 on the basis of elapse of a predetermined second time (for example, 2 seconds) from the time point at which the state of the cover of the first external electronic device 301 switches from the closed state to the open state.

Figure 6C:
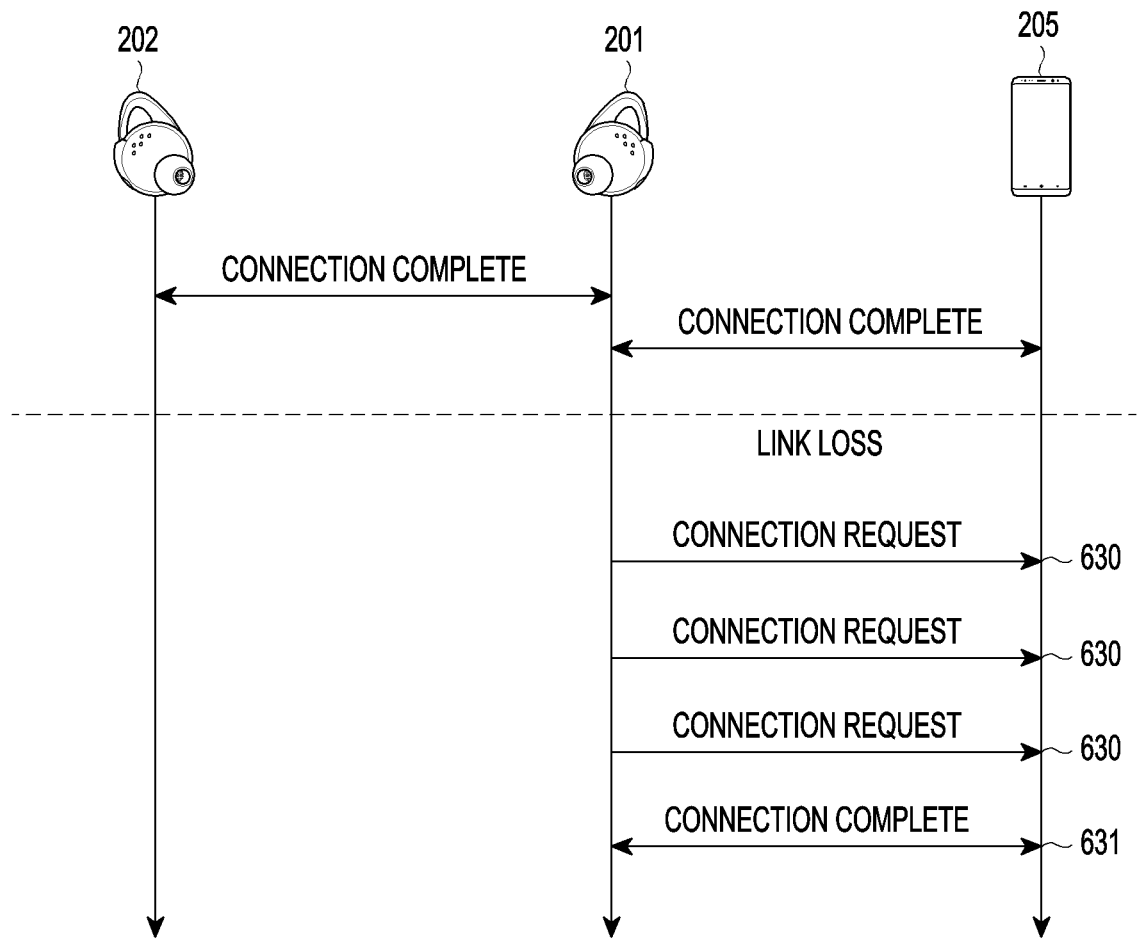
FIG. 6C illustrates an embodiment in which a first electronic device re-connects communication with a second external electronic device according to certain embodiments.

FIG. 6C illustrates an embodiment in which the first electronic device 201 reconnects communication with the second external electronic device 205 according to certain embodiments.

Referring to FIGS. 4 and 6C, the first electronic device 201 may complete the communication connection with the second electronic device 202 as illustrated in FIG. 4. According to an embodiment, the first electronic device 201 may complete the communication connection with the second external electronic device 205. After completing the communication connection with the second external electronic device 205, the first electronic device 201 may identify release of the communication connection with the second external electronic device 205. For example, the communication link may be lost since the first electronic device 201 becomes farther from the second external electronic device 205. The first electronic device 201 may transmit a connection request signal 630 (for example, connection request) to the second external electronic device 205 at predetermined intervals on the basis of identification of release of the communication connection with the second external electronic device 205. The second external electronic device 205 may complete the communication connection with the first electronic device 201 on the basis of reception of the connection request signal 630 from the first electronic device 201 in operation 631.

Figure 7:
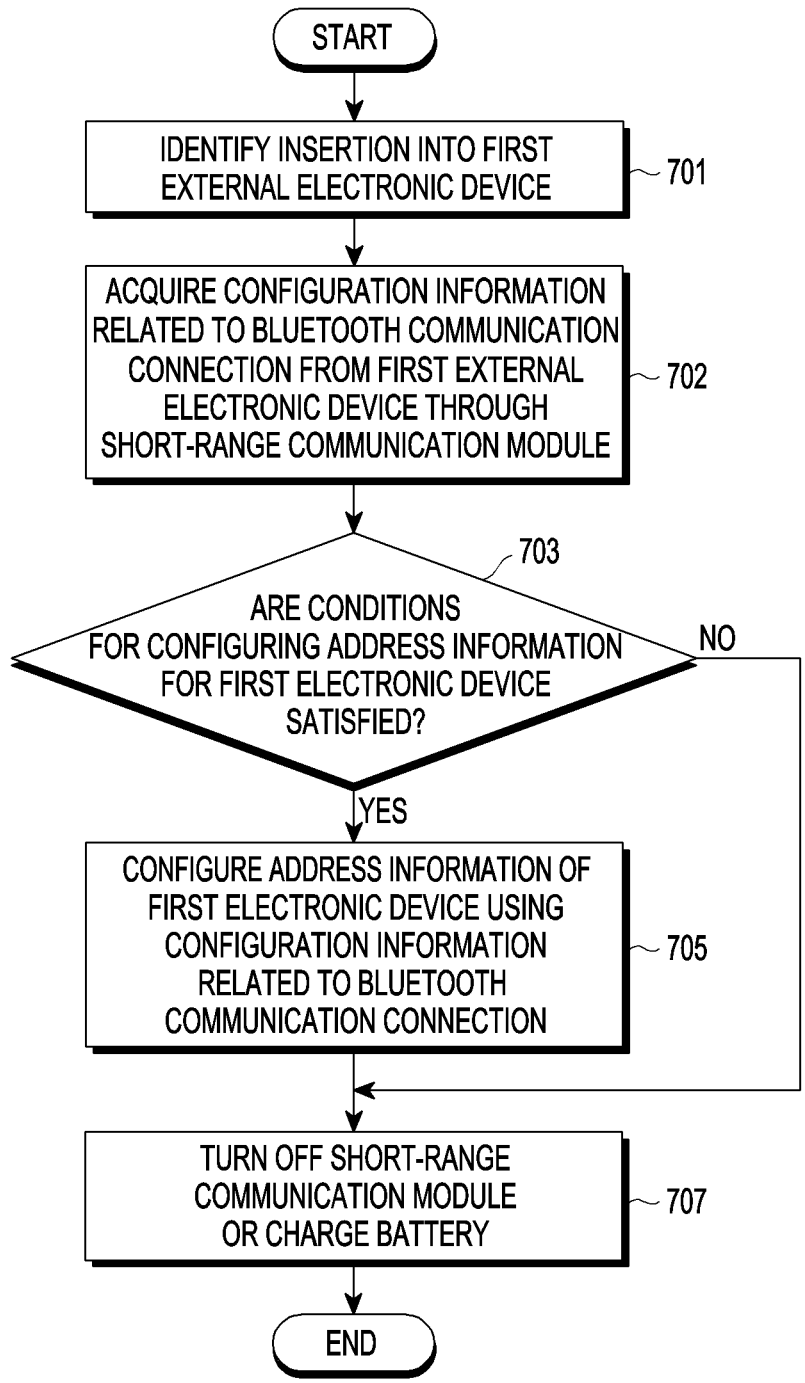
FIG. 7 is a flowchart illustrating a method of configuring at least one piece of address information of a first electronic device according to certain embodiments.

FIG. 7 is a flowchart illustrating a method of configuring address information (for example, address information 820 of FIG. 8) within a first electronic device (for example, the first electronic device 201 of FIG. 2) according to certain embodiments.

Figure 8:
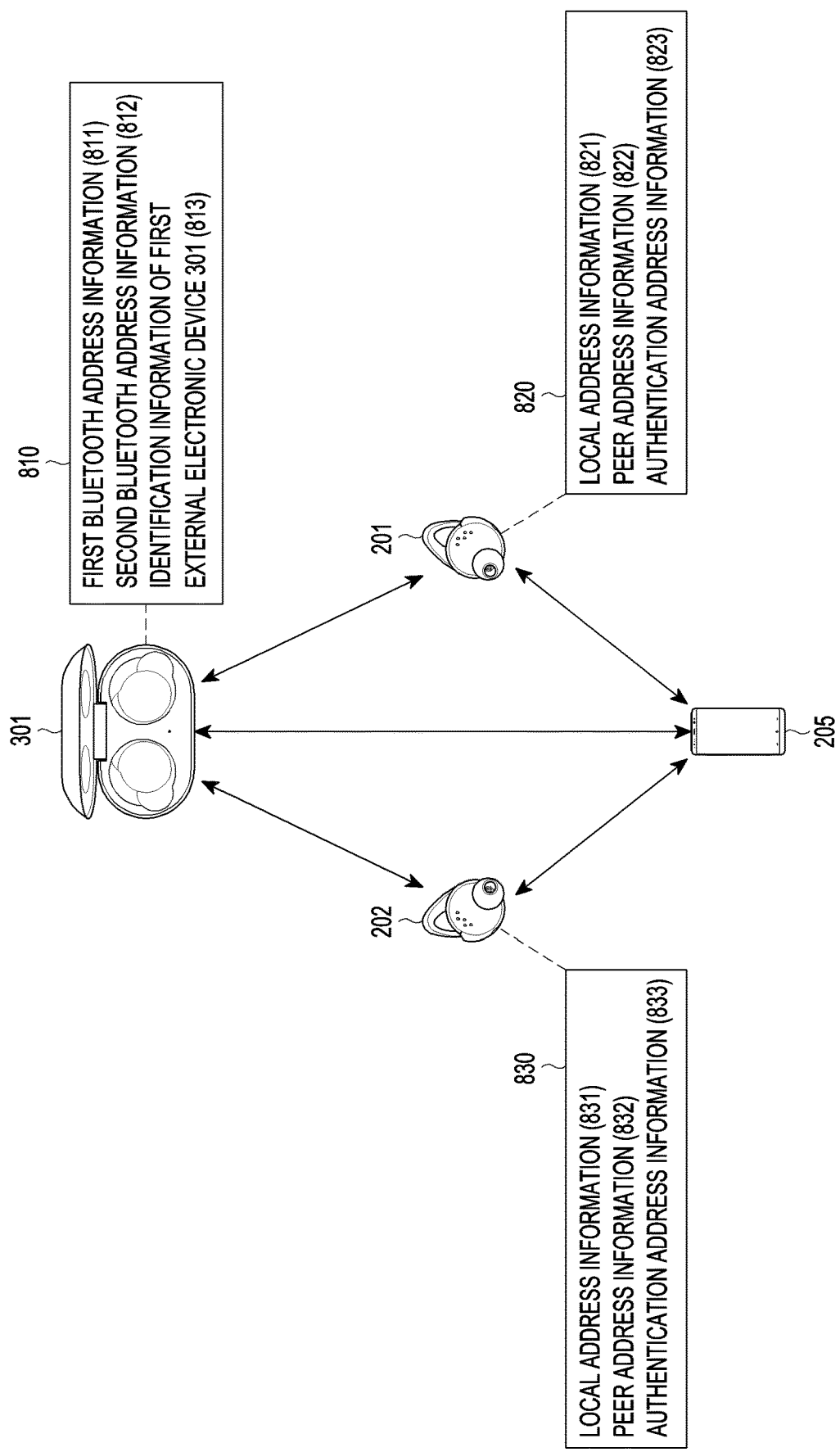
FIG. 8 illustrates an embodiment in which a first electronic device configures address information of the first electronic device by using configuration information related to a Bluetooth communication connection acquired from a first external electronic device according to certain embodiments.

FIG. 8 illustrates an embodiment in which the first electronic device 201 configures address information 820 of the first electronic device 201 on the basis of configuration information 810 related to a Bluetooth communication connection acquired from the first external electronic device 301 according to certain embodiments.

In operation 701, according to certain embodiments, the first electronic device 201 (for example, the processor 290 of FIG. 2) may identify insertion of the first electronic device 201 into the first external electronic device 301. According to an embodiment, the first electronic device 201 may identify insertion into the first external electronic device 301 on the basis of identification of an electrical connection (physical contact) between a connection terminal (for example, charging terminal) included in an interface (for example, the interface 280 of FIG. 2) of the first electronic device 201 and a connection terminal (for example, charging terminal) included in an interface (for example, the electronic device interface 345 of FIG. 3) of the first external electronic device 301. According to an embodiment, the first electronic device 201 may identify insertion into the first external electronic device 301 on the basis of identification that the first electronic device 201 is in an electrically connected state in which power can be wirelessly received from the first external electronic device 301. According to an embodiment, the first electronic device 201 may identify insertion into the first external electronic device 301 on the basis of the performance of short-range wireless communication (for example, NFC or MST) with the first external electronic device 301. According to an embodiment, the first electronic device 201 may wirelessly or wiredly configure the electrical connection with the first external electronic device 301 and identify insertion into the first external electronic device 301 on the basis of identification switching of the first external electronic device 301 from the open state to the closed state. According to an embodiment, the first electronic device 201 is inserted into the first external electronic device 301, the first electronic device 201 may enter a charging standby state or a charging state. The first electronic device 201 may enter the charging state on the basis of acquisition of a charging initiation signal from the first external electronic device 301 in the charging standby state and charge the battery 270.

In operation 702, according to certain embodiments, the first electronic device 201 (for example, processor 290 of FIG. 2) may acquire configuration information 810 related to the Bluetooth communication connection from the first external electronic device 301 through a short-range communication module (for example, a short-range communication module included in the communication module 210 of FIG. 2). According to an embodiment, the configuration information 810 related to the Bluetooth communication connection may include at least one piece of first Bluetooth address information 811 or second Bluetooth address information 812. According to an embodiment, the first Bluetooth address information 811 or the second Bluetooth address information 812 may include a Bluetooth device address (for example, BD_ADDR) or include LE address information generated on the basis of the Bluetooth device address. According to an embodiment, the first Bluetooth address information 811 or the second Bluetooth address information 812 may further include device type information indicating one of a right earbud or a left earbud. According to an embodiment, the first Bluetooth address information 811 or the second Bluetooth address information 812 may further include device type information indicating one of a master device or a slave device. According to an embodiment, the first Bluetooth address information 811 or the second Bluetooth address information 812 may include different Bluetooth device address and device type information. For example, the first Bluetooth address information 811 may include a Bluetooth device address (for example, A) and include information indicating a right type and a master type. In another example, the second Bluetooth address information 812 may include a Bluetooth device address (for example, B) and include information indicating a left type and a slave type. According to an embodiment, the configuration information 810 related to the Bluetooth communication connection may further include identification information 813 of the first external electronic device 301. According to an embodiment, the identification information 813 of the first external electronic device 301 may include communication address information of the first external electronic device 301 (for example, MAC address or Bluetooth address) or include unique identification information such as a serial number configured by a manufacturer of the first external electronic device 301. The identification information 813 of the first external electronic device 301 is not limited to the above example but may include information in various formats for identifying the first external electronic device 301.

According to certain embodiments, the first electronic device 201 (for example, processor 290 of FIG. 2) may acquire the configuration information 810 from the first external electronic device 301 by activating an NFC module included in a short-range communication module.

According to certain embodiments, the first electronic device 201 (for example, processor 290 of FIG. 2) may acquire the configuration information 810 through a wireless charging scheme by activating the antenna module 211 instead of activating the NFC module. According to an embodiment, the first electronic device 201 may acquire the configuration information 810 through a wireless charging scheme by activating one of a coil, a resonator, or a plurality of patch antennas included in the antenna module 211.

According to certain embodiments, the first electronic device 201 (for example, processor 290 of FIG. 2) may acquire the configuration information 810 from the first external electronic device 301 by activating the NFC module or the antenna module 211 in response to identification of insertion into the first external electronic device 301.

According to certain embodiments, the second electronic device (for example, second electronic device 202 of FIG. 2) may acquire the configuration information 810 from the first external electronic device 301 according to embodiments of operation 701.

In operation 703, according to certain embodiments, the first electronic device 201 (for example, processor 290 of FIG. 2) may identify whether conditions for configuring address information 820 of the first electronic device 201 are satisfied. The address information 820 of the first electronic device 201 may include at least one piece of local address information (for example, local address information 821 of FIG. 8), peer address information (for example, peer address information 822 of FIG. 8), or authentication address information (for example, authentication address information 823 of FIG. 8). According to an embodiment, the local address information 821 of the first electronic device 201 may indicate Bluetooth device address (for example, BD_ADDR) of the first electronic device 201, and the peer address information 822 of the first electronic device 201 may indicate a Bluetooth device address of a counterpart device (for example, the second electronic device 202) which forms a pair with the first electronic device 201 in a Bluetooth network. The local address information 821 and the peer address information 822 of the first electronic device 201 may be used for the communication connection with the counterpart device (for example, second electronic device 202) which forms a pair with the first electronic device 201 or the communication connection with the second external electronic device 205. According to an embodiment, the local address information 821 or the peer address information 823 may be the form of a Bluetooth device address (for example, BD_ADDR) in the size of 6 bytes or the form of LE address information generated on the basis of the Bluetooth device address. According to an embodiment, the authentication address information 823 of the first electronic device 201 is address information (for example, MAC address or Bluetooth address) of the external electronic device (for example, first external electronic device 301 of FIG. 3) storing the first electronic device 201 and may include communication address information (for example, MAC address or Bluetooth address) of the first external electronic device 301 or unique identification information such as a serial number configured by a manufacturer of the first external electronic device 301, and may be configured in the first electronic device 201.

According to certain embodiments, conditions for configuring the address information 820 of the first electronic device 201 may include first conditions. According to an embodiment, the first conditions may include the case in which the authentication address information 823 of the first electronic device 201 is not configured. According to an embodiment, the first conditions may include the case in which a signal making a request for configuring the address information 820 of the first electronic device 201 is acquired from the first external electronic device 301. According to an embodiment, the first conditions may include the case in which information included in the signal received from the second electronic device 202 corresponds to the identification information 813 of the first external electronic device 301 acquired from the first external electronic device 301. According to an embodiment, the first conditions may include the case in which a voice command making a request for configuring address information is identified from a user voice acquired through a microphone (for example, the microphone 242 of FIG. 2) included in the first electronic device 201. According to an embodiment, the first electronic device 201 may identify that the conditions for configuring the address information 820 of the first electronic device 201 are satisfied on the basis of identification of satisfaction of at least one of the first conditions. A detailed operation for configuring the address information 820 of the first electronic device 201 on the basis of identification of satisfaction of the first conditions is described below with reference to FIGS. 9, 10A, 10B, and 13. According to an embodiment, the conditions for configuring the address information (for example, address information 830 of FIG. 8) of the second electronic device 202 may include the first conditions. According to an embodiment, the address information 830 of the second electronic device 202 may include at least one piece of local address information (for example, the local address information 831 of FIG. 8), peer address information (for example, the peer address information 832 of FIG. 8), or authentication address information (for example, the authentication address information 833 of FIG. 8).

According to certain embodiments, the conditions for configuring the address information 820 of the first electronic device 201 may further include second conditions. According to an embodiment, the second conditions may include the case in which an acceptance response corresponding to a request for identifying the configuration of the address information 820 of the first electronic device 201 is acquired from the second external electronic device 205. According to an embodiment, the first electronic device 201 may identify that the conditions for configuring the address information 820 of the first electronic device 201 are satisfied on the basis of identification of satisfaction of at least one of the first conditions and satisfaction of the second conditions. A detailed operation for configuring the address information 820 of the first electronic device 201 on the basis of identification of satisfaction of the first condition and the second condition is described below with reference to FIGS. 11, 12, and 14. According to an embodiment, conditions for configuring the address information 830 of the second electronic device 202 may include the second conditions.

According to certain embodiments, the first electronic device 201 (for example, processor 290 of FIG. 2) may identify that the conditions for configuring the address information 820 of the first electronic device 201 are satisfied on the basis of identification that the authentication address information 823 of the first electronic device 201 is not configured as the first conditions.

According to certain embodiments, the first electronic device 201 (for example, processor 290 of FIG. 2) may identify that the conditions for configuring the address information 820 of the first electronic device 201 are satisfied on the basis of acquisition of a signal making a request for configuring the address information 820 of the first electronic device 201 from the first external electronic device 301 as the first conditions. According to an embodiment, the signal making the request for configuring the address information 820 of the first electronic device 201 may be provided from the first external electronic device 301 in response to pressing of a button of the first external electronic device 301 or provided from the first external electronic device 301 in response to identification of a voice command making a request for configuring address information through the microphone of the first external electronic device 301. According to an embodiment, the first electronic device 201 may identify that the conditions for configuring the address information 820 of the first electronic device 201 are satisfied on the basis of acquisition of a signal indicating pressing of a button (for example, the input device 340 of FIG. 3) of the first external electronic device 301 by the user or gripping of a specific area of the first external electronic device 301 for a predetermined time. According to an embodiment, the first external electronic device 301 may transmit a first signal (for example, address configuration request signal) to the first electronic device 201 on the basis of identification of pressing of the button of the first external electronic device 301 by the user or gripping of the specific area of the first external electronic device 301 for the predetermined time, and the first electronic device 201 may identify that the conditions for configuring the address information 820 of the first electronic device 201 are satisfied on the basis of acquisition of the first signal from first external electronic device 301. According to an embodiment, the first electronic device 201 may identify the signal acquired from the first external electronic device 301 through a connection terminal (for example, charging terminal) included in an interface (for example, the interface 280 of FIG. 2) of the first electronic device 201 or the communication module 210.

According to certain embodiments, when the first electronic device 201 (i.e., processor 290 of FIG. 2) is a master device, the first electronic device 201 may identify that the conditions for configuring the address information 820 of the first electronic device 201 are satisfied on the basis of correspondence (for example, matching) between information included in the advertising signal received from the second electronic device 202 and the identification information 813 of the first external electronic device 301 acquired from the first external electronic device 301 as the first conditions. According to an embodiment, when the first electronic device 201 (i.e., processor 290 of FIG. 2) is a master device, the first electronic device 201 may identify that the conditions for configuring the address information 820 of the first electronic device 201 are satisfied on the basis of correspondence (for example, matching) between information included in an EIR packet received from the second electronic device 202 and the identification information 813 of the first external electronic device 301 acquired from the first external electronic device 301.

According to certain embodiments, the first electronic device 201 (i.e., processor 290 of FIG. 2) may identify that the conditions for configuring the address information 820 of the first electronic device 201 are satisfied on the basis of identification of a voice command making a request for configuring address information from a user voice acquired through the microphone 242 included in the first electronic device 201 as the first conditions.

According to certain embodiments, the first electronic device 201 (e.g., processor 290 of FIG. 2) may make a request for identifying the configuration of the address information 820 of the first electronic device 201 to the second external electronic device 205 on the basis of identification of satisfaction of at least one of the first conditions. According to an embodiment, the first electronic device 201 may use a method described in operation 1105 of FIG. 11 below in order to make a request for identifying the configuration of the address information. According to an embodiment, the first electronic device 201 may identify that the conditions for configuring the address information 820 of the first electronic device 201 are satisfied on the basis of identification of acquisition of an acceptance response corresponding to the request for identifying the configuration of the address information 820 of the first electronic device 201 as the second conditions. According to an embodiment, the first electronic device 201 may use a method described in operation 1107 of FIG. 11 in order to acquire the acceptance response corresponding to the identification request. According to certain embodiments, operations performed by the first electronic device 201 on the basis of identification of satisfaction of the first conditions and the second conditions by the first electronic device 201 (i.e., processor 290 of FIG. 2) are described with reference to FIGS. 11, 12, and 14 below.

According to certain embodiments, the first electronic device 201 (e.g., processor 290 of FIG. 2) may identify that the conditions for configuring the address information 820 of the first electronic device 201 are not satisfied on the basis of identification of non-satisfaction of the first conditions or identification of satisfaction of the first conditions but non-satisfaction of the second conditions. According to an embodiment, the first electronic device 201 may identify that the conditions for configuring the address information 820 of the first electronic device 201 are not satisfied on the basis of identification of the configuration of the authentication address information 823 of the first electronic device 201. According to an embodiment, the first electronic device 201 may identify that the conditions for configuring the address information 820 of the first electronic device 201 are not satisfied on the basis of identification of correspondence (i.e., matching or sameness) between the authentication address information 823 of the first electronic device 201 and the identification information 813 of the first external electronic device 301. According to an embodiment, the first electronic device 201 may identify that the conditions for configuring the address information 820 of the first electronic device 201 are not satisfied on the basis of identification of non-correspondence (for example, difference) between the authentication address information 823 of the first electronic device 201 and the identification information 813 of the first external electronic device 301.

According to certain embodiments, the first electronic device 201 (i.e., processor 290 of FIG. 2) may perform operation 702 after operation 703. In this case, the first electronic device 201 may identify satisfaction of the conditions for configuring the address information 820 of the first electronic device 201 are satisfied according to operation 703 in response to identification of insertion into the first external electronic device 301 and may acquire the configuration information 810 related to the Bluetooth communication connection from the first external electronic device 301 according to operation 702 in response to identification of satisfaction of the conditions. Description related thereto is made with reference to FIGS. 13 and 14 below.

According to certain embodiments, the second electronic device 202 may identify whether the conditions for configuring the address information 820 of the second electronic device 202 are satisfied through embodiments of operation 703 described above.

According to certain embodiments, when the conditions for configuring the address information 820 of the first electronic device 201 are satisfied, the first electronic device 201 (i.e., processor 290 of FIG. 2) may configure the address information 820 of the first electronic device 201 using the configuration information 810 related to the Bluetooth communication connection in operation 705.

According to certain embodiments, the first electronic device 201 (i.e., processor 290 of FIG. 2) may identify information corresponding to the first electronic device 201 among first Bluetooth address information 811 or second Bluetooth address information 812 included in the configuration information 810. For example, it is assumed that the first Bluetooth address information 811 is Bluetooth address information of the right earbud and the second Bluetooth address information 812 is Bluetooth address information of the left earbud. In this case, when the first electronic device 201 corresponds to the right earbud, the first electronic device 201 may identify the first Bluetooth address information 811 as information corresponding to the first electronic device 201 and the second Bluetooth address information 812 as information that does not correspond to the first electronic device 201. Unlike this, when the first electronic device 201 corresponds to the left earbud, the first electronic device 201 may identify the second Bluetooth address information 812 as information corresponding to the first electronic device 201 and the first Bluetooth address information 811 as information that does not correspond to the first electronic device 201.

According to certain embodiments, the first electronic device 201 (i.e., processor 290 of FIG. 2) may configure the address information 820 of the first electronic device 201 using the configuration information 810 related to the Bluetooth communication connection on the basis of identification of satisfaction of the conditions for configuring the address information 820 of the first electronic device 201. According to an embodiment, the first electronic device 201 may perform at least one of the operations of 1) configuring information corresponding to the first electronic device 201 among the first Bluetooth address information 811 or the second Bluetooth address information 812 as the local address information 821 of the first electronic device 201, 2) configuring the other information that does not corresponding to the first electronic device 201 among the first Bluetooth address information 811 or the second Bluetooth address information 812 as the peer address information 822 of the first electronic device 201, or 3) configuring the identification information 813 of the first external electronic device 301 as the authentication address information 823 of the first electronic device 201 on the basis of identification of satisfaction of the conditions for configuring the address information 820 of the first electronic device 201. In the following description, the operation of configuring the address information 820 of the first electronic device 201 may include an operation of performing at least one of the operations 1), 2), and or 3). According to certain embodiments, the first electronic device 201 (i.e., processor 290 of FIG. 2) may transmit the configuration information 810 to the second external electronic device 205 through the pre-established Bluetooth communication connection on the basis of identification of satisfaction of the conditions for configuring the address information 820 of the first electronic device 201 in the state in which the Bluetooth communication connection has been already established with the second external electronic device 205. According to certain embodiments, the first electronic device 201 (e.g., processor 290 of FIG. 2) may activate a Bluetooth module on the basis of identification of satisfaction of the conditions for configuring the address information 820 of the first electronic device 201 in the state in which the Bluetooth communication connection is not established with the second external electronic device 205 and transmit the configuration information 810 to the second external electronic device 205 through the established Bluetooth communication connection after completing the Bluetooth communication connection with the second external electronic device 205 using the address information 820 of the first electronic device 201 before acquiring the configuration information 810.

According to certain embodiments, the first electronic device 201 (e.g.,processor 290 of FIG. 2) may acquire local address information (i.e., the local address information 831 of FIG. 8) of another electronic device (i.e., the second electronic device 202) having the electrical connection with the first external electronic device 301 through the first external electronic device 301 or directly acquire the same from the second electronic device 202 through a communication connection (i.e., the third link 515 of FIG. 5) established with the second electronic device 202. In this case, the first electronic device 201 may configure the local address information 831 of the second electronic device 202 as the peer address information 822 of the first electronic device 201. According to an embodiment, the first electronic device 201 may transmit the local address information 821 of the first electronic device 201 to the second electronic device 202 having the electrical connection with the first external electronic device 301 through the first external electronic device 301 or directly transmit the same to the second electronic device 202 through the communication connection established with the second electronic device 202. In this case, the second electronic device 202 may configure the local address information 821 of the first electronic device 201 as the peer address information 832 of the second electronic device 202.

According to certain embodiments, after completing configuring new address information of the first electronic device 201 according to identification of satisfaction of the first conditions, the first electronic device 201 (i.e., processor 290 of FIG. 2) may make a request for configuring the new address information of the first electronic device 201 to the second external electronic device 205. According to an embodiment, after completing configuring the new address information of the first electronic device 201 in the state in which the communication connection with the second external electronic device 205 is not established, the first electronic device 201 may activate a communication module (i.e., the communication module 210 of FIG. 2), complete the communication connection with the second external electronic device 205 by using the new address information of the first electronic device 201 on the basis of the description made with reference to FIG. 6A, 6B, or 6C, and then make a request for identifying configuration information for the new address information of the first electronic device 201 to the second external electronic device 205 through the activated communication module 210. According to an embodiment, completing configuring the new address information of the first electronic device 201 according to identification of satisfaction of the first conditions in the state in which the communication connection with the second external electronic device 205 is maintained, the first electronic device 201 may release the communication connection based on the previous address information, complete the communication connection with the second external electronic device 205 by using the new address information, and then make a request for identifying the configuration of the new address information of the first electronic device 201 to the second external electronic device 205 through the communication module 210. According to an embodiment, the first electronic device 201 may use the method described in operation 1105 of FIG. 11 below in order to make a request for identifying the configuration of the address information. According to an embodiment, the first electronic device 201 may maintain the address information (i.e., at least one piece of the local address information 821, the peer address information 822, or the authentication address information 823) newly configured in the first electronic device 201 on the basis of acquisition of an acceptance response corresponding to the identification request from the second external electronic device 205 through the communication module 210. According to an embodiment, the first electronic device 201 may release the configuration of the new address information of the first electronic device 201 on the basis of acquisition of a rejection response corresponding to the identification request from the second external electronic device 205 through the communication module 210, reconstruct the previously configured address information, and make the communication connection with the second electronic device 202 or the second external electronic device 205 by using the reconstructed previous address information. According to an embodiment, the first electronic device 201 may use the method described in operation 1107 of FIG. 11 below in order to acquire the acceptance response corresponding to the identification request.

According to certain embodiments, when operation 703 is performed earlier than operation 702, the first electronic device 201 (e.g., processor 290 of FIG. 2) may perform operation 705 after operation 702. In this case, the first electronic device 201 may acquire the configuration information 810 related to the Bluetooth communication connection from the first external electronic device 301 according to operation 702 in response to identification of satisfaction of the conditions for configuring the address information 820 of the first electronic device 201 and configure the address information 820 of the first electronic device 201 by using the configuration information 810 according to operation 705. Description related thereto is made with reference to FIGS. 13 and 14 below.

According to certain embodiments, the second electronic device 202 may configure information corresponding to the second electronic device 202 among the first Bluetooth address information 811 or the second Bluetooth address information 812 as local address information (i.e., the local address information 831 of FIG. 8) of the second electronic device 202, configure the other information that does not correspond to the second electronic device 202 among the first Bluetooth address information 811 or the second Bluetooth address information 812 as peer address information (i.e., the peer address information 832 of FIG. 8) of the second electronic device 202, and configure the identification information 813 of the first external electronic device 301 as authentication address information (e.g., the authentication address information 833 of FIG. 8) of the second electronic device 202 by using the embodiments of operation 705.

In operation 707, according to certain embodiments, the first electronic device 201 (i.e., processor 290 of FIG. 2) may turn off a short-range communication module of the first electronic device 201 or charge a battery (e.g., the battery 270 of FIG. 2). According to an embodiment, in operation 707, the first electronic device 201 may turn off some elements (e.g., NFC module) of the short-range communication module. According to an embodiment, the first electronic device 201 may turn off the short-range communication module of the first electronic device 201 in response to acquisition of the configuration information 810 of the first electronic device 201 according to operation 701. According to an embodiment, in operation 707, the first electronic device 201 may turn off power of the first electronic device 201.

According to certain embodiments, the first electronic device 201 (e.g., processor 290 of FIG. 2) may turn of at least some elements (e.g., NFC module) of the short-range communication module 210 of the first electronic device 201 on the basis of identification of non-satisfaction of the conditions for configuring the address information 820 of the first electronic device 201.

According to certain embodiments, the first electronic device 201 (e.g., processor 290 of FIG. 2) may turn off power of the first electronic device 201 on the basis of identification of non-satisfaction of the conditions for configuring the address information 820 of the first electronic device 201.

According to certain embodiments, the first electronic device 201 (e.g., processor 290 of FIG. 2) may charge the battery 270 of the first electronic device 201 through the first external electronic device 301 on the basis of identification of non-satisfaction of the conditions for configuring the address information 820 of the first electronic device 201. According to certain embodiments, the first electronic device 201 may charge the battery (e.g., the battery 270 of FIG. 2) of the first electronic device 201 through the first external electronic device 301 on the basis of identification of the configuration of the authentication address information 823 of the first electronic device 201. According to certain embodiments, the first electronic device 201 may charge the battery (e.g., the battery 270 of FIG. 1) of the first electronic device 201 through the first external electronic device 301 on the basis of identification of correspondence (for example, matching or sameness) between the authentication address information 823 of the first electronic device 201 and the identification information 813 of the first external electronic device 301. According to an embodiment, the first electronic device 201 may charge the battery (e.g., the battery 270 of FIG. 1) of the first electronic device 201 through the first external electronic device 301 on the basis of identification of non-correspondence (for example, difference) between the authentication address information 823 of the first electronic device 201 and the identification information 813 of the first external electronic device 301.

According to certain embodiments, the first electronic device 201 (e.g., processor 290 of FIG. 2) may turn off at least some elements (e.g., NFC module) of the short-range communication module of the first electronic device 201 after configuring the address information 820 of the first electronic device 201. According to certain embodiments, the first electronic device 201 (e.g., processor 290 of FIG. 2) may turn off power of the first electronic device 201 after configuring the address information 820 of the first electronic device 201. According to certain embodiments, the first electronic device 201 (e.g., processor 290 of FIG. 2) may charge the battery 270 of the first electronic device 201 through the first external electronic device 301 after configuring the address information 820 of the first electronic device 201.

According to certain embodiments, the first electronic device 201 (for example, processor 290 of FIG. 2) may turn off power of the first electronic device 201 and charge the battery 270.

According to certain embodiments, the first electronic device 201 (e.g., processor 290 of FIG. 2) may make a new communication connection with the second external electronic device 205 or the second electronic device 202 by using the address information 820 of the first electronic device 201 newly configured through a Bluetooth module included in the short-range communication module. According to an embodiment, the first electronic device 201 may make a Bluetooth communication connection with the second external electronic device 205 or the second electronic device 202 on the basis of the updated local address information 821 and the updated peer address information 822 of the first electronic device 201. For example, the first electronic device 201 may automatically make the Bluetooth communication connection with the second electronic device 202 through the method described with reference to FIG. 4 or automatically make the Bluetooth communication connection with the second external electronic device 205 through the method described with reference to FIG. 6A, 6B, or 6C on the basis of the local address information 821 and the peer address information 822 newly configured in operations 701 to 705. According to an embodiment, the first electronic device 201 may activate the Bluetooth module in response to identification of switching of the first external electronic device 301 from the closed state to the open state during insertion into the first external electronic device 301 and make the Bluetooth communication connection with at least one of the second external electronic device 205 or the second electronic device 202 on the basis of the updated local address information 821 and the updated peer address information 822 of the first electronic device 201. For example, referring to FIG. 4, the first electronic device 201 may make the Bluetooth communication connection with the second electronic device 202 corresponding to the updated peer address information 822 on the basis of the updated local address information 821 and the updated peer address information 822 through the Bluetooth module in response to identification of switching of the first external electronic device 301 from the closed state to the open state during insertion into the first external electronic device 301.

Figure 9:
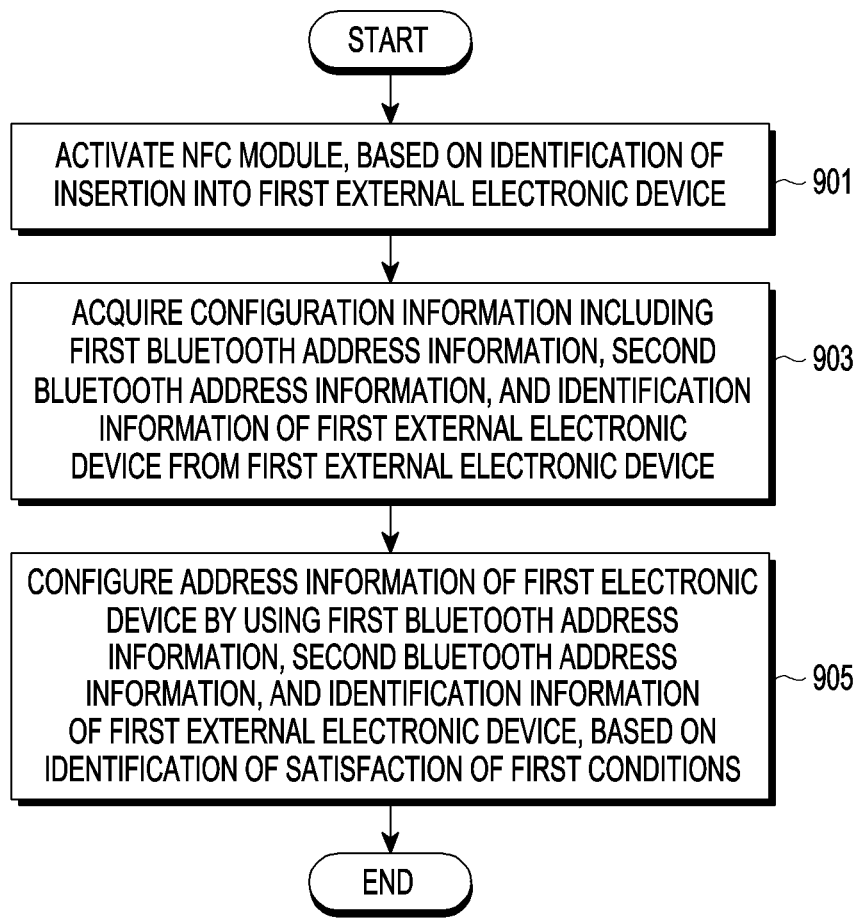
FIG. 9 is a flowchart illustrating a method by which a first electronic device configures address information of a first electronic device by using configuration information acquired from a first external electronic device according to certain embodiments.

FIG. 9 is a flowchart illustrating a method by which a first electronic device (e.g., the first electronic device 201 of FIG. 2) configures address information (for example, the address information 820 of FIG. 8) of the first electronic device 201 using configuration information (e.g., the configuration information 810 of FIG. 8) acquired from a first external electronic device (for example, the first external electronic device 301 of FIG. 3) according to certain embodiments.

Figure 10A:
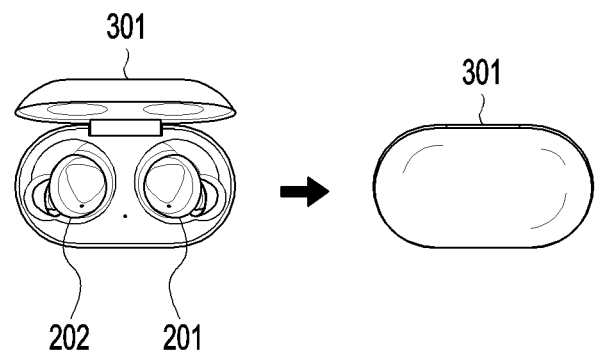
FIG. 10A illustrates an embodiment in which a first electronic device activates an NFC module according to certain embodiments.

FIG. 10A illustrates an embodiment in which the first electronic device 201 activates an NFC module according to certain embodiments.

Figure 10B:
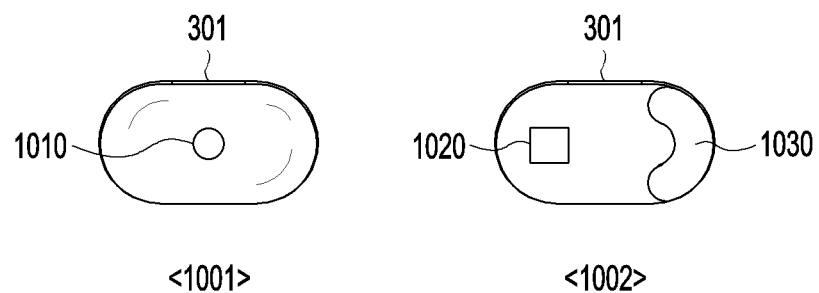
FIG. 10B illustrates an embodiment in which a first electronic device acquires a signal making a request for configuring address information according to certain embodiments.

FIG. 10B illustrates an embodiment in which the first electronic device 201 acquires a signal making a request for configuring address information according to certain embodiments.

In operation 901, according to certain embodiments, the first electronic device 201 (e.g., processor 290 of FIG. 2) may activate the NFC module on the basis of identification of insertion of the first electronic device 201 into the first external electronic device 301. For example, referring to FIG. 10A, the first electronic device 201 may identify physical contact between a connection terminal (e.g., charging terminal) included in an interface (e.g., the interface 280 of FIG. 2) of the first electronic device 201 and a connection terminal (e.g., charging terminal) included in an interface (e.g., the electronic device interface 345 of FIG. 3) of the first external electronic device 301 and activate/turn on the NFC module of the first electronic device 201 on the basis of identification of switching of the cover of the first external electronic device 301 from the open state to the closed state. In another example, referring to FIG. 10A, the first electronic device 201 may identify the electrical connection between an antenna module (e.g., the antenna module 211 of FIG. 2) of the first electronic device 201 and an antenna module (e.g., the antenna module 321 of FIG. 3) of the first external electronic device 301 through a wireless charging scheme and activate the NFC module of the first electronic device 201 on the basis of identification of switching of the cover of the first external electronic device 301 from the open state to the closed state. According to an embodiment, the first electronic device 201 may activate the antenna module 211 instead of activating the NFC module to acquire the configuration information 810 through the wireless charging scheme on the basis of insertion into the first external electronic device 301.

In operation 903, according to certain embodiments, the first electronic device 201 (e.g., processor 290 of FIG. 2) may acquire the configuration information 810 including first Bluetooth address information (e.g., the first Bluetooth address information 811 of FIG. 8), second Bluetooth address information (e.g., the second Bluetooth address information 812 of FIG. 8), and identification information (e.g., the identification information 813 of FIG. 8) of the first external electronic device 301 from the first external electronic device 301 through the NFC module.

In operation 905, according to certain embodiments, the first electronic device 201 (e.g., processor 290 of FIG. 2) may configure the address information 820 of the first electronic device 201 by using the first Bluetooth address information 811, the second Bluetooth address information 812, and the identification information 813 of the external electronic device 301 on the basis of satisfaction of the first conditions for configuring the address information 820 of the first electronic device 201. According to an embodiment, as the first conditions, the first electronic device 201 may configure information corresponding to the first electronic device 201 among the first Bluetooth address information 811 or the second Bluetooth address information 812 as local address information (e.g., the local address information 821 of FIG. 8) of the first electronic device 201, configure the other information that does not correspond to the first electronic device 201 among the first Bluetooth address information 811 or the second Bluetooth address information 812 as peer address information (e.g., the peer address information 822 of FIG. 8) of the first electronic device 201, and configure the identification information 813 of the first external electronic device 301 as the authentication address information 823 of the first electronic device 201 on the basis of identification of non-configuration of authentication address information (e.g., the authentication address information 823 of FIG. 8) of the first electronic device 201. According to an embodiment, as the first conditions, the first electronic device 201 may configure information corresponding to the first electronic device 201 among the first Bluetooth address information 811 or the second Bluetooth address information 812 as the local address information 821 of the first electronic device 201, configure the other information that does not correspond to the first electronic device 201 among the first Bluetooth address information 811 or the second Bluetooth address information 812 as the peer address information 822 of the first electronic device 201, and configure the identification information 813 of the first external electronic device 301 as the authentication address information 823 of the first electronic device 201 on the basis of acquisition of a signal making a request for configuring the address information 820 of the first electronic device 201 from the first external electronic device 301. For example, referring to <1001> of FIG. 10B, the first electronic device 201 may configure the address information 820 of the first electronic device 201 by using the first Bluetooth address information 811, the second Bluetooth address information 812, and the identification information 813 of the first external electronic device 301 on the basis of acquisition of a signal indicating pressing of a button 1010 (for example, the input device 340 of FIG. 3) of the first external electronic device 301 by the user. In another example, referring to <1002> of FIG. 10B, the first electronic device 201 may configure the address information 820 of the first electronic device 201 by using the first Bluetooth address information 811, the second Bluetooth address information 812, and the identification information 813 of the first external electronic device 301 on the basis of acquisition of a signal indicating touching of a first area 1020 of the first external electronic device 301 by the user or gripping of a second area 1030 for a predetermined time.

According to certain embodiments, the first electronic device 201 (for example, processor 290 of FIG. 2) may perform operation 707 of FIG. 7 on the basis of identification of non-satisfaction of the first conditions for configuring the address information 820 of the first electronic device 201.

Figure 11:
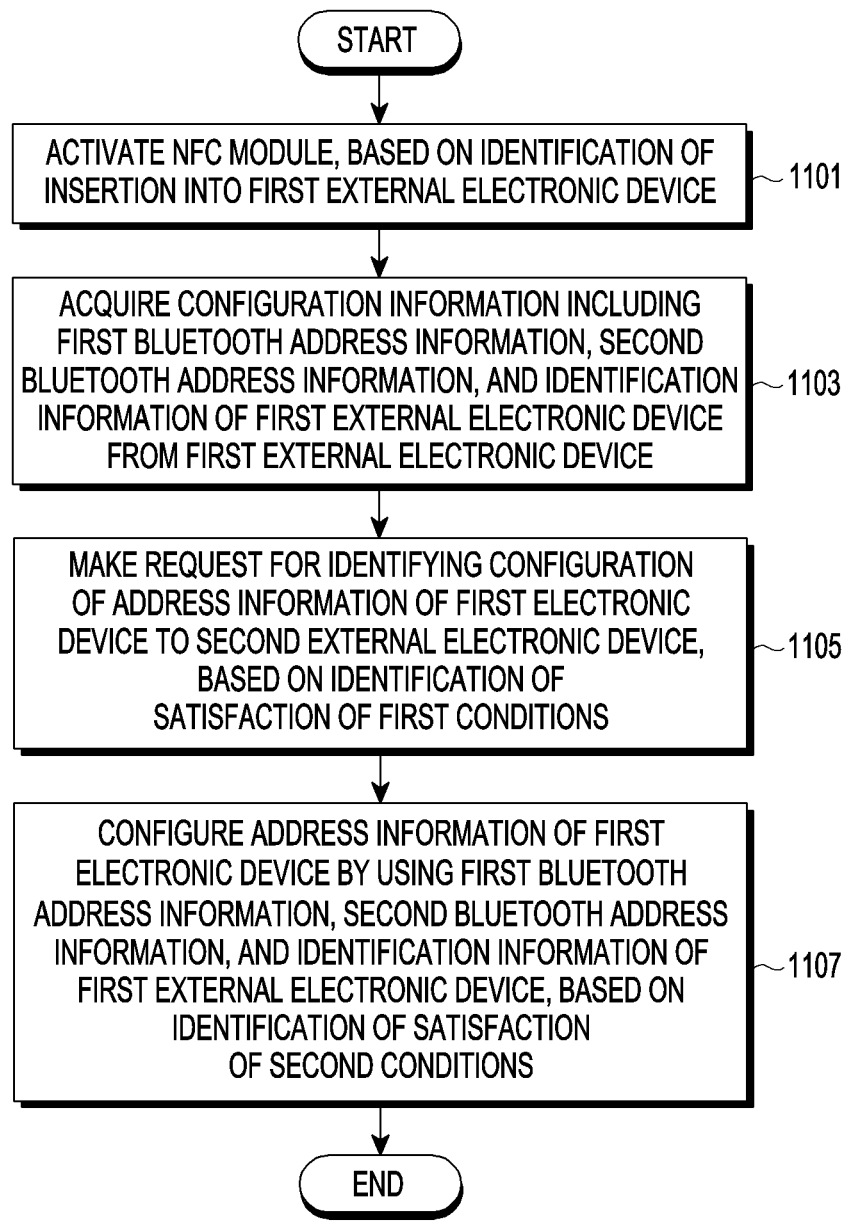
FIG. 11 is a flowchart illustrating another method by which a first electronic device configures address information of the first electronic device by using configuration information acquired from a first external electronic device according to certain embodiments.

FIG. 11 is a flowchart illustrating another method by which a first electronic device (for e.g., the first electronic device 201 of FIG. 2) configures address information (e.g., the address information 820 of FIG. 8) of the first electronic device 201 by using configuration information (e.g., the configuration information 810 of FIG. 8) acquired from a first external electronic device (e.g., the first external electronic device 301 of FIG. 3) according to certain embodiments.

Figure 12:
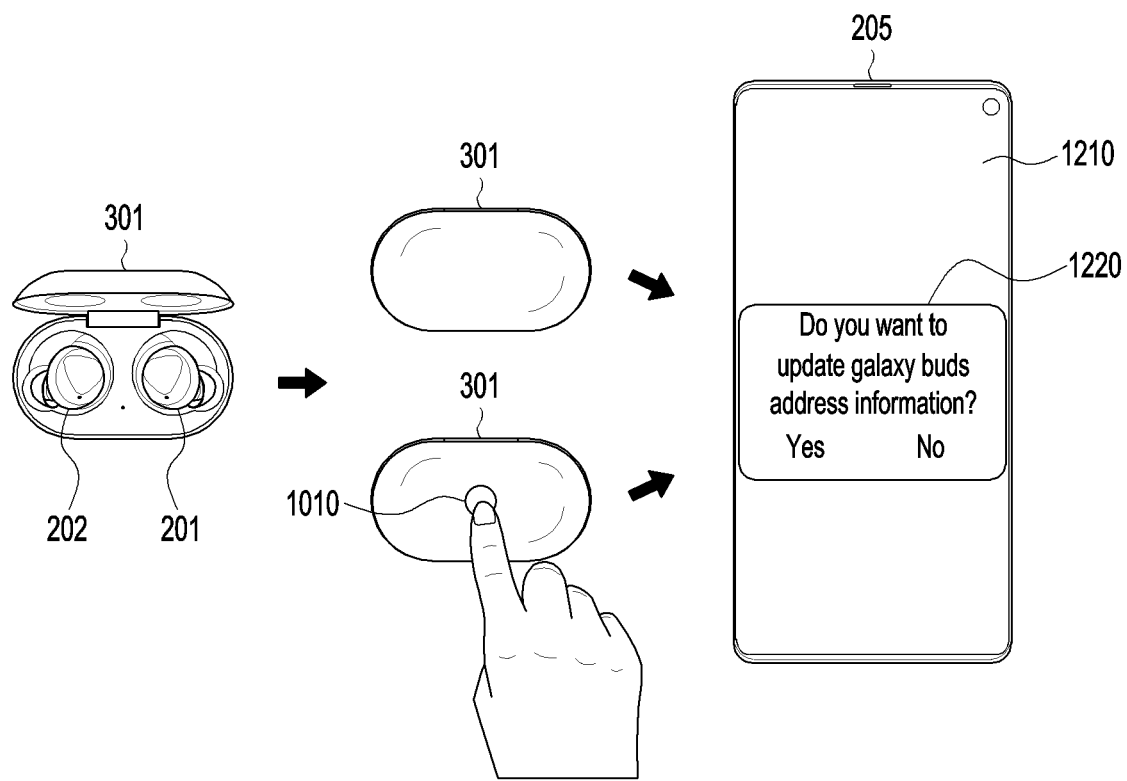
FIG. 12 illustrates an embodiment in which a first electronic device configures address information of the first electronic device by using configuration information according to certain embodiments.

FIG. 12 illustrates an embodiment in which the first electronic device 201 configures the address information 820 of the first electronic device 201 by using the configuration information 810 according to certain embodiments.

In operation 1101, according to certain embodiments, the first electronic device 201 (e.g., processor 290 of FIG. 2) may activate the NFC module on the basis of identification of insertion of the first electronic device 201 into the first external electronic device 301. The first electronic device 201 may perform operation 1101 through the method described in operation 901 of FIG. 9.

In operation 1103, according to certain embodiments, the first electronic device 201 (e.g., processor 290 of FIG. 2) may acquire the configuration information 810 including first Bluetooth address information (e.g., the first Bluetooth address information 811 of FIG. 8), second Bluetooth address information (e.g., the second Bluetooth address information 812 of FIG. 8), and identification information (e.g., the identification information 813 of FIG. 8) of the first external electronic device 301 from the first external electronic device 301 through the NFC module.

In operation 1105, according to certain embodiments, the first electronic device 201 (e.g., processor 290 of FIG. 2) may make a request for identifying a configuration of the address information 820 of the first electronic device 201 to the second external electronic device 205 on the basis of identification of satisfaction of the first conditions for configuring the address information 820 of the first electronic device 201. According to certain embodiments, the first conditions may include the first conditions described in operation 703 of FIG. 7.

According to certain embodiments, the first electronic device 201 (e.g., processor 290 of FIG. 2) may directly make a request for identifying the configuration of the address information 820 of the first electronic device 201 to the second external electronic device 205 on the basis of identification of satisfaction of the first conditions. According to an embodiment, the first electronic device 201 may activate a Bluetooth module on the basis of identification of satisfaction of the first conditions in the state in which a Bluetooth communication connection is not established with the second external electronic device 205, establish the Bluetooth communication connection with the second external electronic device 205 by using the address information 820 (e.g., address information before the configuration) of the first electronic device 201 before acquisition of the configuration information 810, and then make a request for identifying the configuration of the address information 820 of the first electronic device 201 to the second external electronic device 205 through the activated Bluetooth module. According to an embodiment, the first electronic device 201 and/or the second electronic device 202 may make a request for identifying the configuration of the address information 820 and/or 830 of the first electronic device 201 and/or the second electronic device 202 to the second external electronic device 205 through the Bluetooth communication connection on the basis of identification of satisfaction of the first conditions in the state in which the Bluetooth communication connection is established with the second external electronic device 205. For example, the first electronic device 201 may make a request for identifying the configuration of the address information 820 of the first electronic device 201 to the second external electronic device 205 through the Bluetooth communication connection on the basis of identification of satisfaction of the first conditions by the first electronic device which is a master device in the state in which the first electronic device 201 and the second electronic device 202 establish the Bluetooth communication connection with the second external electronic device 205. According to an embodiment, the first electronic device 201 may make a request for identifying the configuration of the address information 820 of the first electronic device 201 to the external electronic device 102 and the second electronic device 202 may make a request for identifying the configuration of the address information 830 of the second electronic device 202 to another external electronic device 104 on the basis of identification of satisfaction of the first conditions in the state in which the first electronic device 201 is connected to the external electronic device (e.g., the electronic device 102 of FIG. 1) and identification of satisfaction of the first conditions in the state in which the second electronic device 202 is connected to another external electronic device (e.g., the electronic device 104 of FIG. 1).

According to certain embodiments, the first electronic device 201 (e.g., processor 290 of FIG. 2) may make a request for identifying the configuration of the address information 820 of the first electronic device 201 to the second external electronic device 205 through the first external electronic device 301 on the basis of identification of satisfaction of the first conditions. According to an embodiment, the first electronic device 201 may make a request for identifying the configuration of the address information 820 of the first electronic device 201 to the first external electronic device 301 through an interface (e.g., the interface 280 of FIG. 2) on the basis of identification of satisfaction of the first conditions. According to an embodiment, the first external electronic device 301 may activate a communication module (e.g., the communication module 320 of FIG. 3) on the basis of acquisition of the identification request from the first electronic device 201 and make a request for identifying the configuration of the address information 820 of the first electronic device 201 to the second external electronic device 205 through the activated communication module 320.

According to an embodiment, the first electronic device 201 (e.g., processor 290 of FIG. 2) may make a request for identifying the configuration of the address information 830 of the second electronic device 202 to the second external electronic device 205 on the basis of acquisition of the request for identifying the configuration of the address information 830 of the second electronic device 202 from the second electronic device 202 which is inserted with the first electronic device 201 in the state in which the Bluetooth communication connection is established with the second external electronic device 205. In this case, the second electronic device 202 may make a request for identifying the configuration of the address information 830 of the second electronic device 202 to the first electronic device 201 through the interface 280 on the basis of identification of satisfaction of the first conditions for configuring the address information 830 of the second electronic device 202.

According to an embodiment, the first electronic device 201 (e.g., processor 290 of FIG. 2) may make a request for identifying the configuration of the address information 820 of the first electronic device 201 to the second external electronic device 205 on the basis of identification of satisfaction of the first conditions during insertion into the first external electronic device 301. For example, referring to FIG. 12, the first electronic device 201 may make a request for identifying the configuration of the address information of the electronic device to the second external electronic device on the basis of identification of non-configuration of the authentication address information 823 of the first electronic device 201 or acquisition of a specific signal (for example, pressing of the button 1010) from the first external electronic device during insertion into the first external electronic device 301.

According to an embodiment, the second external electronic device 205 (e.g., processor 120 of FIG. 1) may display a message inquiring about the configuration of the address information on the basis of acquisition of the request for identifying the configuration of the address information 820 or 830 of the first electronic device 201 or the second electronic device 202 from the first external electronic device 301 or the first electronic device 201. For example, referring to FIG. 12, the second external electronic device 205 may display a message 1220 inquiring about the configuration of the address information 820 or 830 of the first electronic device 201 or the second electronic device 202 on a display 1210 (e.g., the display device 160 of FIG. 1) on the basis of acquisition of the request for identifying the configuration of the address information 820 or 830 of the first electronic device 201 or the second electronic device 202 from the first external electronic device 301 or the first electronic device 201. According to an embodiment, the second external electronic device 205 may display the message 1220 inquiring about the configuration of the address information 830 of the second electronic device 202 on the basis of acquisition of the request for identifying the configuration of the address information 830 of the second electronic device 202 that is not registered in the second external electronic device 205 from the first electronic device 201 which is connected to the second external electronic device 205.

According to certain embodiments, the first electronic device 201 (e.g., processor 290 of FIG. 2) may perform operation 707 of FIG. 7 on the basis of identification of non-satisfaction of the first conditions for configuring the address information 820 of the first electronic device 201.

In operation 1107, according to certain embodiments, the first electronic device 201 (e.g., processor 290 of FIG. 2) may configure the address information 820 of the first electronic device 201 by using the first Bluetooth address information 811, the second Bluetooth address information 812, and the identification information 813 of the external electronic device 301 on the basis of satisfaction of the second conditions for configuring the address information 820 of the first electronic device 201. According to an embodiment, the first electronic device 201 may identify satisfaction of the second conditions on the basis of acquisition of an acceptance response corresponding to the request for identifying the configuration of the address information 820 of the first electronic device 201. According to an embodiment, the first electronic device 201 may identify non-satisfaction of the second conditions on the basis of acquisition of a rejection response corresponding to the request for identifying the configuration of the address information 820 of the first electronic device 201. According to an embodiment, the first electronic device 201 may acquire a response corresponding to the request for identifying the configuration of the address information 820 of the first electronic device 201 from the second external electronic device 205 through the Bluetooth module. According to an embodiment, the first electronic device 201 may acquire a response corresponding to the request for identifying the configuration of the address information 820 of the first electronic device 201 from the first external electronic device 301 or the second electronic device 202 through the interface 280.

According to certain embodiments, the first electronic device 201 (e.g., processor 290 of FIG. 2) may configure information corresponding to the first electronic device 201 among the first Bluetooth address information 811 or the second Bluetooth address information 812 as local address information (e.g., the local address information 821 of FIG. 8) of the first electronic device 201, configure other information that does not correspond to the first electronic device 201 among the first Bluetooth address information 811 or the second Bluetooth address information 812 as peer address information (e.g., the peer address information 822 of FIG. 8) of the first electronic device 201, and configure the identification information 813 of the first external electronic device 301 as the authentication address information 823 of the first electronic device 201 on the basis of acquisition of an acceptance response corresponding to the request for identifying the configuration of the address information 820 of the first electronic device 201 as the second conditions.

According to certain embodiments, the first electronic device 201 (e.g., processor 290 of FIG. 2) may transfer the acquired response to the second electronic device 202 through the interface 280 on the basis of acquisition of the response corresponding to the request for identifying the configuration of the address information 830 of the second electronic device 202 which is inserted with the first electronic device 201 in the state in which the Bluetooth communication connection is established with the second external electronic device 205. According to an embodiment, the first electronic device 201 may directly acquire the response corresponding to the request for identifying the configuration of the address information 830 of the second electronic device 202 from the second external electronic device 205 or acquire the same through the first external electronic device 301.

According to an embodiment, the first electronic device 201 (e.g., processor 290 of FIG. 2) may perform operation 707 of FIG. 7 on the basis of acquisition of a rejection response corresponding to the request for identifying the configuration of the address information 820 or 830 of the first electronic device 201 or the second electronic device 202.

Figure 13:
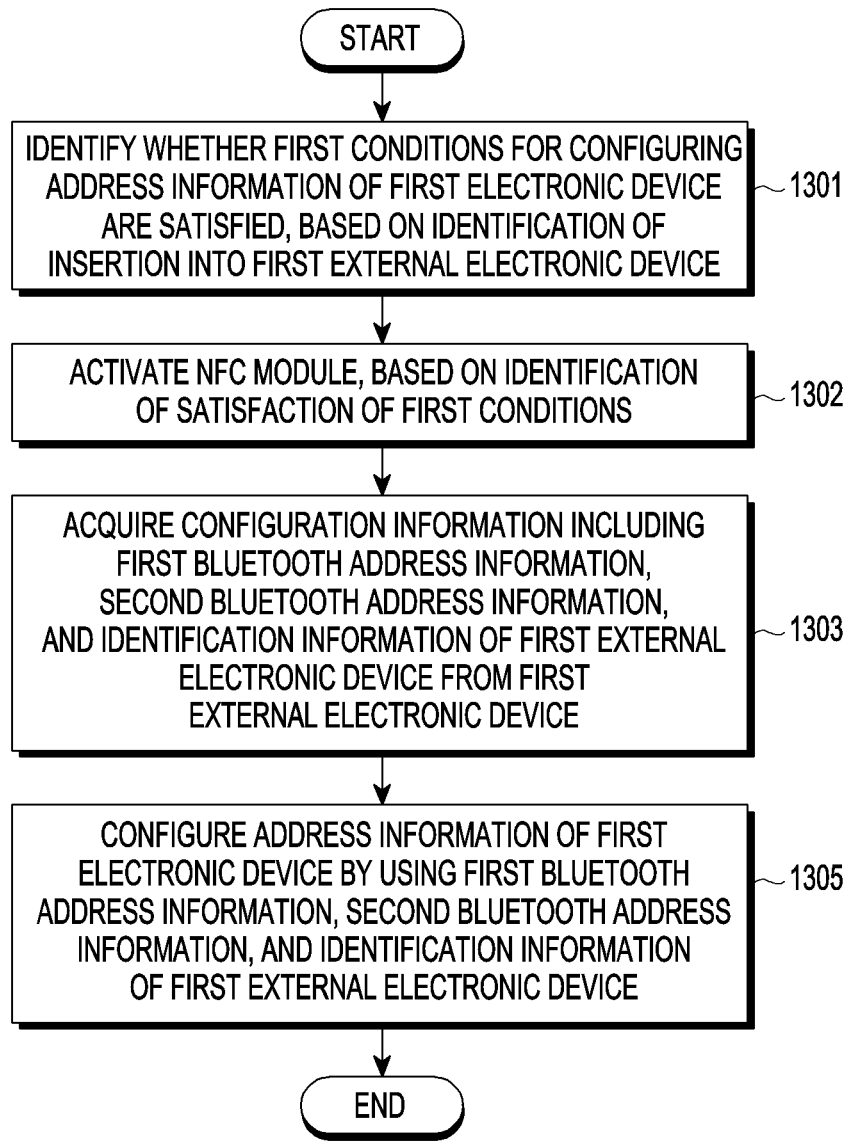
FIG. 13 is a flowchart illustrating another method by which a first electronic device configures address information of the first electronic device by using configuration information acquired from a first external electronic device according to certain embodiments.

FIG. 13 is a flowchart illustrating another method by which the first electronic device 201 configures address information (e.g., the address information 820 of FIG. 8) of the first electronic device 201 by using configuration information (e.g., the configuration information 810 of FIG. 8) acquired from the first external electronic device 301 according to certain embodiments.

In operation 1301, according to certain embodiments, the first electronic device 201 (e.g., processor 290 of FIG. 2) may identify whether the first conditions for configuring the address information 820 of the first electronic device 201 are satisfied on the basis of identification of insertion of the first electronic device 201 into the first external electronic device 301. According to an embodiment, the first electronic device 201 may identify whether authentication address information (e.g., the authentication address information 823 of FIG. 8) of the first electronic device 201 is configured on the basis of identification of insertion into the first external electronic device 301. According to an embodiment, the first electronic device 201 may identify whether a signal making a request for configuring the address information 820 of the first electronic device 201 is acquired from the first external electronic device 301 on the basis of identification of insertion into the first external electronic device 301. According to certain embodiments, the first conditions are not limited to the above example and may include the first conditions described in operation 703 of FIG. 7.

In operation 1302, according to certain embodiments, the first electronic device 201 (e.g., processor 290 of FIG. 2) may activate the NFC module on the basis of identification of satisfaction of the first conditions for configuring the address information 820 of the first electronic device 201. According to an embodiment, the first electronic device 201 may activate the NFC module on the basis of identification of non-configuration of the authentication address information 823 of the first electronic device 201 as the first conditions. According to an embodiment, the first electronic device 201 may activate the NFC module on the basis of acquisition of the signal making the request for configuring the address information 820 of the first electronic device 201 from the first external electronic device 301 as the first conditions. For example, referring to <1001> of FIG. 10B, the first electronic device 201 may switch the turned-off NFC module to the turned-on state on the basis of acquisition of a signal indicating pressing of the button 1010 of the first external electronic device 301 by the user. In another example, referring to <1002> of FIG. 10B, the first electronic device 201 may switch the turned-off NFC module 210 to the turned-on state on the basis of acquisition of a signal indicating touching of the first area 1020 of the first external electronic device 301 by the user or gripping of the second area 1030 for a predetermined time. According to an embodiment, the first electronic device 201 may identify the signal acquired from the first external electronic device 301 through a connection terminal (for example, charging terminal) included in an interface (e.g., the interface 280 of FIG. 2) of the first electronic device 201 or the communication module 210. According to certain embodiments, the first electronic device 201 may activate the antenna module 211 to acquire the configuration information 810 through the wireless charging scheme instead of activating the NFC module.

According to certain embodiments, the first electronic device 201 (e.g., processor 290 of FIG. 2) may perform operation 707 of FIG. 7 on the basis of identification of non-satisfaction of the first conditions for configuring the address information 820 of the first electronic device 201.

In operation 1303, according to certain embodiments, the first electronic device 201 (e.g., processor 290 of FIG. 2) may acquire the configuration information 810 including first Bluetooth address information (e.g., the first Bluetooth address information 811 of FIG. 8), second Bluetooth address information (e.g., the second Bluetooth address information 812 of FIG. 8), and identification information (e.g., the identification information 813 of FIG. 8) of the first external electronic device 301 from the first external electronic device 301 through the NFC module.

In operation 1305, according to certain embodiments, the first electronic device 201 (e.g., processor 290 of FIG. 2) may configure the address information 820 of the first electronic device 201 by using the first Bluetooth address information 811, the second Bluetooth address information 812, and the identification information 813 of the first external electronic device 301. According to an embodiment, the first electronic device 201 may configure information corresponding to the first electronic device 201 among the first Bluetooth address information 811 or the second Bluetooth address information 812 as local address information (e.g., the local address information 821 of FIG. 8) of the first electronic device 201, configure the other information that does not correspond to the first electronic device 201 among the first Bluetooth address information 811 or the second Bluetooth address information 812 as peer address information (e.g., the peer address information 822 of FIG. 8) of the first electronic device 201, and configure the identification information 813 of the first external electronic device 301 as the authentication address information 823 of the first electronic device 201 on the basis of acquisition of the first Bluetooth address information 811, the second Bluetooth address information 812, and the identification information 813 of the first external electronic device 301.

Figure 14:
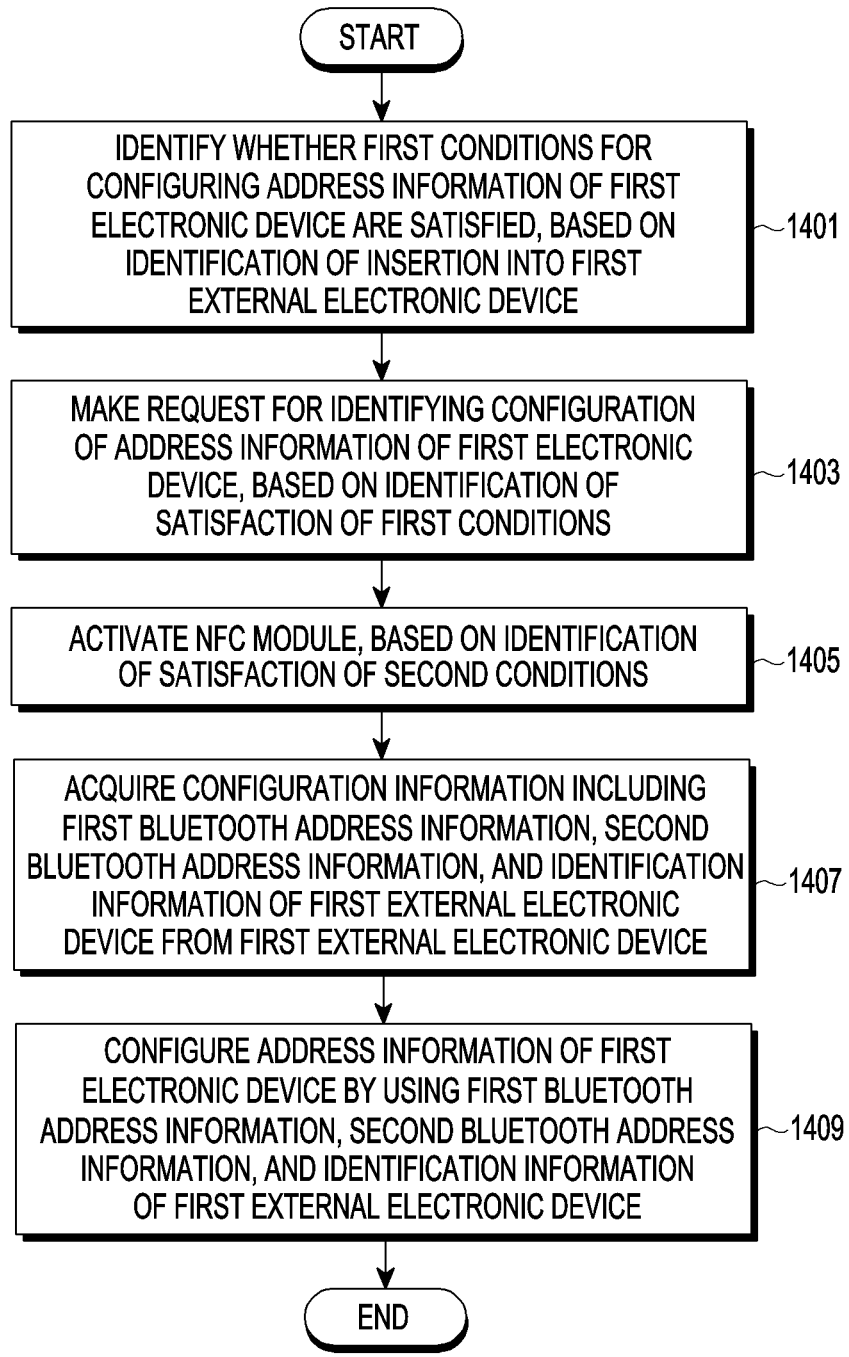
FIG. 14 is a flowchart illustrating another method by which a first electronic device configures address information of the first electronic device by using configuration information acquired from a first external electronic device according to certain embodiments.

FIG. 14 is a flowchart illustrating another embodiment by which a first electronic device (e.g., the first electronic device 201 of FIG. 2) configures the address information 820 of the first electronic device 201 by using configuration information (e.g., the configuration information 810 of FIG. 8) acquired from the first external electronic device 301.

In operation 1401, according to certain embodiments, the first electronic device 201 (e.g., processor 290 of FIG. 2) may identify whether the first conditions for configuring the address information 820 of the first electronic device 201 are satisfied on the basis of identification of insertion of the first electronic device 201 into the first external electronic device 301. According to certain embodiments, the first electronic device 201 (e.g., processor 290 of FIG. 2) may perform operation 1401 through the method illustrated in operation 1301 of FIG. 13.

In operation 1403, according to certain embodiments, the first electronic device 201 (e.g., processor 290 of FIG. 2) may make a request for identifying the configuration of the address information 820 of the first electronic device 201 on the basis of identification of satisfaction of the first conditions for configuring the address information 820 of the first electronic device 201. According to certain embodiments, the first electronic device 201 (e.g., processor 290 of FIG. 2) may perform operation 1403 through the method illustrated in operation 1105 of FIG. 11.

In operation 1405, according to certain embodiments, the first electronic device 201 (e.g., processor 290 of FIG. 2) may activate the NFC module on the basis of identification of satisfaction of the second conditions for configuring the address information 820 of the first electronic device 201. According to an embodiment, the first electronic device 201 may activate the NFC module on the basis of acquisition of an acceptance response corresponding to a request for identifying the configuration of the address information 820 of the first electronic device 201 from the second external electronic device 205 through the Bluetooth module as the second conditions. According to an embodiment, the first electronic device 201 may activate the NFC module on the basis of acquisition of the acceptance response corresponding to the request for identifying the configuration of the address information 820 of the first electronic device 201 from the first external electronic device 301 through the interface 280 as the second conditions.

According to certain embodiments, the first electronic device 201 (e.g., processor 290 of FIG.) may perform operation 707 of FIG. 7 on the basis of acquisition of a rejection response corresponding to the request for identifying the configuration of the address information 820 of the first electronic device 201.

In operation 1407, according to certain embodiments, the first electronic device 201 (e.g., processor 290 of FIG. 2) may acquire the configuration information 810 including first Bluetooth address information (for example, the first Bluetooth address information 811 of FIG. 8), second Bluetooth address information (e.g., the second Bluetooth address information 812 of FIG. 8), and identification information (e.g., the identification information 813 of FIG. 8) of the first external electronic device 301 from the first external electronic device 301 through the NFC module.

In operation 1409, according to certain embodiments, the first electronic device 201 (e.g., processor 290 of FIG. 2) may configure the address information 820 of the first electronic device 201 by using the first Bluetooth address information 811, the second Bluetooth address information 812, and the identification information 813 of the first external electronic device 301. According to certain embodiments, the first electronic device 201 (e.g., processor 290 of FIG. 2) may perform operation 1409 through the method illustrated in operation 1305 of FIG. 13.

Figure 15:
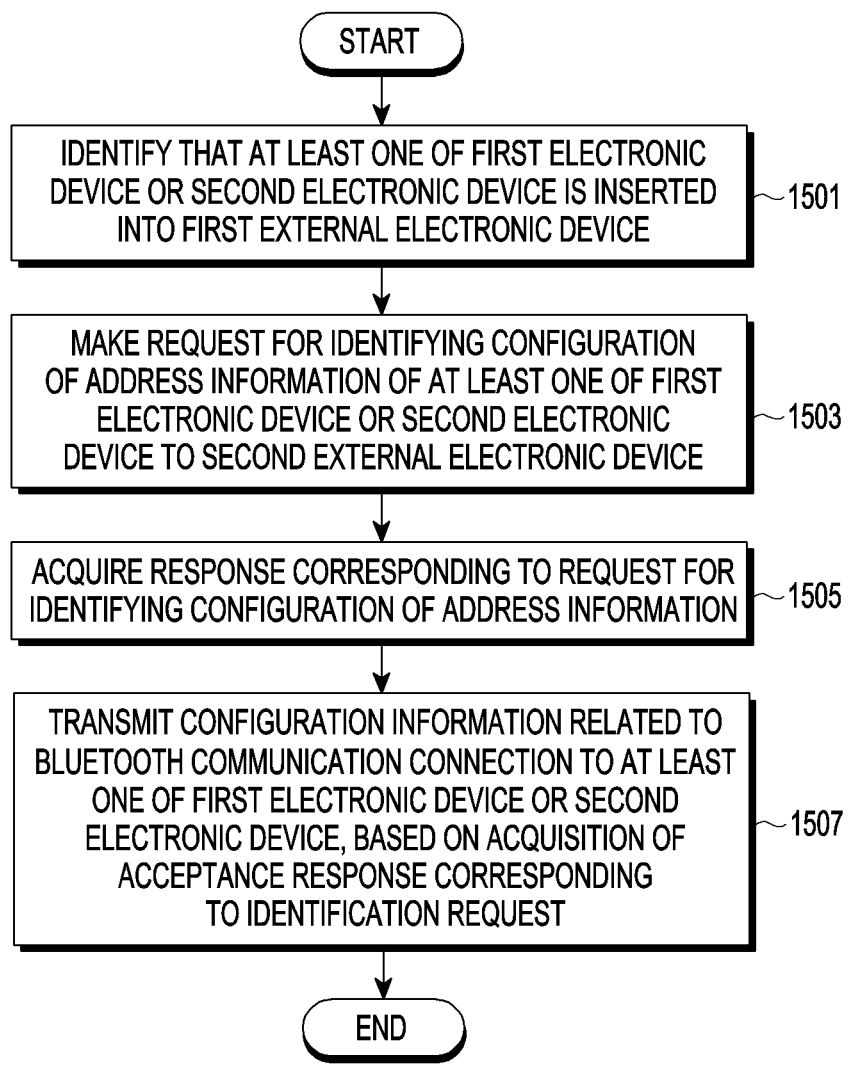
FIG. 15 is a flowchart illustrating a method by which a first external electronic device provides configuration information to at least one electronic device according to certain embodiments.

FIG. 15 is a flowchart illustrating a method by which a first external electronic device (e.g., the first external electronic device 301 of FIG. 3) provides configuration information (e.g., the configuration information 810 of FIG. 8) to at least one electronic device (for example, at least one of the first electronic device 201 or the second electronic device 202 of FIG. 2) according to certain embodiments.

In operation 1501, according to certain embodiments, the first external electronic device 301 (e.g., processor 310 of FIG. 3) may identify that at least one of the first electronic device 201 or the second electronic device 202 is inserted into the first external electronic device 301. According to an embodiment, the first external electronic device 301 may identify that the first electronic device 201 or the second electronic device 202 is inserted into the first external electronic device 301 on the basis of identification of the electrical connection (physical contact) between an electronic device interface (e.g., the electronic device interface 345 of FIG. 3) and a connection terminal (e.g., charging terminal) included in an interface (for example, the interface 280 of FIG. 2) of the first electronic device 201 or the second electronic device 202. According to an embodiment, the first external electronic device 301 may identify that the first electronic device 201 or the second electronic device 202 is inserted into the first external electronic device 301 on the basis of identification of the electrical connection state in which power can be wirelessly transmitted to the first electronic device 201 or the second electronic device 202. According to an embodiment, the first external electronic device 301 may wirelessly or wiredly establish the electrical connection with the first electronic device 201 or the second electronic device 202 and identify that the first electronic device 201 or the second electronic device 202 is inserted into the first external electronic device 301 on the basis of identification of switching of the first external electronic device 301 from the open state to the closed state.

In operation 1503, according to certain embodiments, the first external electronic device 301 (e.g., processor 310 of FIG. 3) may make a request for identifying the configuration of address information (e.g., the address information 820 and/or the address information 830 of FIG. 8) of at least one of the first electronic device 201 or the second electronic device 202 to a second external electronic device (e.g., the second external electronic device 205 of FIG. 2).

According to certain embodiments, the first external electronic device 301 (e.g., processor 310 of FIG. 3) may make a request for identifying the configuration of the address information 820 and/or 830 of at least one of the first electronic device 201 or the second electronic device 202 to the second external electronic device 205 through a short-range communication module (e.g., Bluetooth module).

According to certain embodiments, the first external electronic device 301 (e.g., processor 310 of FIG. 3) may activate at least a portion of the communication module (e.g., communication module 320 of FIG. 3) and make a request for identifying the configuration of the address information 820 and/or 830 of at least one of the first electronic device 201 or the second electronic device 202 to the second external electronic device 205 through the activated communication module 320 on the basis of acquisition of the request for identifying the configuration of the address information 820 and/or 830 of the corresponding electronic device from at least one of the first electronic device 201 or the second electronic device 202 or acquisition of a user input.

According to certain embodiments, the first external electronic device 301 (e.g., processor 310 of FIG. 3) may make a request for identifying the configuration of the address information 820 and/or 830 of at least one of the first electronic device 201 or the second electronic device 202, which has made the request for identification, to the second external electronic device 205 on the basis of acquisition of the request for identifying the configuration of the address information 820 and/or 830 of the corresponding electronic device from at least one of the first electronic device 201 or the second electronic device 202 through the electronic device interface 345. According to an embodiment, the first external electronic device 301 may make a request for identifying the configuration of the address information 820 and/or 830 of at least one of the first electronic device 201 or the second electronic device 202, which has made the request for identification, to the second external electronic device 205 on the basis of acquisition of the request for identifying the configuration of the address information from the first electronic device 201 or the second electronic device 202 satisfying the first conditions described in operation 703 of FIG. 7 among the first electronic device 201 or the second electronic device 202 inserted into the first external electronic device 301. For example, the first external electronic device 301 may make a request for identifying the configuration of the address information 820 of the first electronic device 201 to the second external electronic device 205 on the basis of acquisition of the request for identifying the configuration of the address information from the first electronic device 201 in which authentication address information (e.g., the authentication address information 823 of FIG. 8) is not configured.

According to certain embodiments, the first external electronic device 301 (e.g., processor 310 of FIG. 3) may directly make a request for identifying the configuration of the address information 820 and/or 830 of at least one of the inserted first electronic device 201 or second electronic device 202 to the second external electronic device 205 on the basis of acquisition of the user input. According to an embodiment, the first external electronic device may make a request for identifying the configuration of the address information 820 and/or 830 of at least one of the inserted first electronic device 201 or second electronic device 202 to the second external electronic device 205 on the basis of identification of pressing of a button (e.g., the button 1010 of FIG. 10) of the first external electronic device 301 by the user or touching of a specific area (for example, the first area 1020 of FIG. 10) of the first external electronic device 301. According to an embodiment, the first external electronic device 301 may make a request for identifying the configuration of the address information 820 and/or 830 of at least one of the inserted first electronic device 201 or second electronic device 202 to the second external electronic device 205 on the basis of identification of a voice command making a request for configuring the address information from a user voice acquired through a microphone included in the first external electronic device 301.

According to certain embodiments, the first external electronic device 301 (e.g., processor 310 of FIG. 3) may make a request for identifying the configuration of the address information 820 and/or 830 of at least one of the inserted first electronic device 201 or second electronic device 202 to the second external electronic device 205 through the first electronic device 201 or the second electronic device 202 on the basis of acquisition of the user input. According to an embodiment, the first external electronic device 301 may make a request for identifying the configuration of the address information to the inserted first electronic device 201 or second electronic device 202 on the basis of acquisition of the user input. According to an embodiment, the first electronic device 201 or the second electronic device 202 may establish a Bluetooth communication connection with the second external electronic device 205 and make a request for identifying the configuration of address information to the second external electronic device 205 through the Bluetooth communication connection on the basis of acquisition of the request for identifying the configuration of the address information from the first external electronic device 301. According to an embodiment, when both the first electronic device 201 and the second electronic device 202 are inserted into the first external electronic device 301, the first external electronic device 301 may make a request for identifying the configuration of the address information to the first electronic device 201 or the second electronic device 202 preconfigured as a master device.

In operation 1505, according to certain embodiments, the first external electronic device 301 (e.g., processor 310 of FIG. 3) may acquire a response corresponding to the request for identifying the configuration of the address information from the second external electronic device 205. According to an embodiment, the first external electronic device 301 may acquire an acceptance response corresponding to the identification request or a rejection response corresponding to the identification request. According to an embodiment, the first external electronic device 301 may directly acquire the response corresponding to the request for identifying the configuration of the address information from the second external electronic device 205 through a short-range communication module (e.g., Bluetooth module) included in the communication module 320. According to an embodiment, the first external electronic device 301 may acquire the response corresponding to the request for identifying the configuration of the address information from the first electronic device 201 or the second electronic device 202 to which the first external electronic device 301 made the request for identification through the electronic device interface 345.

In operation 1507, according to certain embodiments, the first external electronic device 301 (e.g., processor 310 of FIG. 3) may transmit the configuration information 810 related to the Bluetooth communication connection to at least one of the first electronic device 201 or the second electronic device 202 through the communication module 320 or the electronic device interface 345 on the basis of acquisition of the acceptance response corresponding to the identification request. According to an embodiment, the first external electronic device 301 may transmit a signal for activating at least a portion of the communication module 210 (e.g., NFC module) included in at least one of the first electronic device 201 or the second electronic device 202 to the first electronic device 201 and/or the second electronic device 202 on the basis of acquisition of the acceptance response corresponding to the identification request from the first electronic device 201 or the second electronic device 202 to which the second external electronic device 205 or the first external electronic device 301 has made the request for identification. According to an embodiment, the first external electronic device 301 may transmit the configuration information 810 only to a specific electronic device making a request for identifying the configuration of the address information. For example, the first external electronic device 301 may acquire the request for identifying the configuration of the address information only from the first electronic device 201 and transmit the configuration information 810 only to the first electronic device 201 on the basis of acquisition of the acceptance response corresponding to the identification request from the first electronic device 201 from the second external electronic device 205. According to an embodiment, the first external electronic device 301 may transmit the configuration information 810 to at least one of the first electronic device 201 or the second electronic device 202 on the basis of acquisition of the response corresponding to the request for identifying the configuration of the address information from the second external electronic device 205 through a short-range communication module (e.g., Bluetooth module). According to an embodiment, the first external electronic device 301 may store the configuration information 810 related to the Bluetooth communication connection in the memory 360. The configuration information 810 may include at least one piece of first Bluetooth address information (e.g., the first Bluetooth address information 821 of FIG. 8), second Bluetooth address information (e.g., the second Bluetooth address information 822 of FIG. 8), or identification information of the first external electronic device 301 (e.g., the identification information 823 of the first external electronic device 301 of FIG. 8).

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., a program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

According to certain embodiments, the electronic device 201 may include the communication module 210 including a short-range communication module, the processor 290 operatively connected to the short-range communication module, and the memory 250 operatively connected to the processor 290, and the memory 250 may store instructions causing the processor 290 to, when executed, identify insertion of the electronic device 201 into the first external electronic device 301, acquire configuration information related to a Bluetooth communication connection from the first external electronic device 310 through the short-range communication module, identify whether conditions for configuring address information of the electronic device 201 are satisfied, and configure the address information of the electronic device 201 using the configuration information on the basis of identification of satisfaction of the conditions.

According to certain embodiments, the instructions may cause the processor 290 to acquire the configuration information from the first external electronic device 301 by activating an NFC module included in the short-range communication module in response to identification of the insertion of the electronic device 201 into the first external electronic device 301.

According to certain embodiments, the instructions may cause the processor 290 to wirelessly or wiredly establish an electrical connection with the first external electronic device 301 and identify that the electronic device is inserted into the first external electronic device 301 on the basis of identification of switching of the first external electronic device 301 from an open state to a closed state.

According to certain embodiments, the configuration information may include first Bluetooth address information, second Bluetooth address information, and identification information of the first external electronic device, and the address information of the electronic device may include local address information of the electronic device, peer address information, and authentication address information.

According to certain embodiments, the instructions may cause the processor 290 to identify that the conditions are satisfied on the basis of non-configuration of the authentication address information of the electronic device 201 or acquisition of a specific signal from the first external electronic device 301.

According to certain embodiments, the instructions may cause the processor 290 to make a request for identifying a configuration of the address information of the electronic device 201 to a second external electronic device 205 on the basis of identification of non-configuration of the authentication address information of the electronic device 201 or acquisition of a specific signal from the first external electronic device 301 and identify that the conditions are satisfied on the basis of acquisition of an acceptance response corresponding to the identification request from the second external electronic device 205.

According to certain embodiments, the instructions may cause the processor 290 to activate, in a first state in which the Bluetooth communication connection is not established with the second external electronic device 205, a Bluetooth module included in the short-range communication module on the basis of identification of non-configuration of the authentication address information or acquisition of the specific signal in the first state, establish the Bluetooth communication connection with the second external electronic device 205 using the address information before acquisition of the configuration information through the activated Bluetooth module, and make a request for identifying the configuration of the address information to the second external electronic device 205 through the established Bluetooth communication connection.

According to certain embodiments, the instructions may cause the processor 290 to perform at least one of 1) an operation of configuring information corresponding to the electronic device 201 among the first Bluetooth address information or the second Bluetooth address information as the local address information of the electronic device 201, 2) an operation of configuring the other information that does not correspond to the electronic device 201 among the first Bluetooth address information or the second Bluetooth address information as the peer address information of the electronic device 201, or 3) an operation of configuring the identification information of the first external electronic device 301 as the authentication address information of the electronic device 201 on the basis of identification of satisfaction of the conditions.

According to certain embodiments, the electronic device 201 may include the battery 270 operatively connected to the processor 290, and the instructions may cause the processor 290 to turn off the short-range communication module and charge the battery through the first external electronic device 301 on the basis of identification of non-satisfaction of the conditions.

According to certain embodiments, the electronic device 201 may be configured to wirelessly receive audio data from the second external electronic device 205 through a Bluetooth module included in the short-range communication module, and the instructions may cause the processor 290 to further make a Bluetooth communication connection with another electronic device 202 on the basis of the configured peer address information of the electronic device 201 through the Bluetooth module in response to identification of switching of the first external electronic device 301 from a closed state to an open state while the electronic device 201 is inserted into the first external electronic device 301.

According to certain embodiments, a method of configuring address information by the electronic device 201 may include an operation of identifying that the electronic device 201 is inserted into the first external electronic device 301, an operation of acquiring configuration information related to a Bluetooth communication connection from the first external electronic device 301 through a short-range communication module included in the communication module 210, an operation of identifying whether conditions for configuring address information of the electronic device 201 are satisfied, and an operation of configuring the address information of the electronic device 201 using the configuration information on the basis of identification of satisfaction of the conditions.

According to certain embodiments, the operation of acquiring the configuration information may include an operation of acquiring the configuration information from the first external electronic device by activating an NFC module included in the short-range communication module in response to identification of insertion of the electronic device into the first external electronic device.

According to certain embodiments, the operation of identifying that the electronic device is inserted into the first external electronic device may include an operation of wirelessly or wiredly establishing an electrical connection with the first external electronic device and identifying that the electronic device is inserted into the first external electronic device on the basis of identification of switching of the first external electronic device from an open state to a closed state.

According to certain embodiments, the operation of identifying whether the conditions are satisfied may include an operation of identifying that the conditions are satisfied on the basis of identification of non-configuration of the authentication address information of the electronic device or acquisition of a specific signal from the first external electronic device.

According to certain embodiments, the operation of identifying whether the conditions are satisfied may include an operation of making a request for identifying the configuration of the address information of the electronic device to the second external electronic device on the basis of identification of non-confirmation of the authentication address information of the electronic device or acquisition of a specific signal from the first external electronic device and an operation of identifying that the conditions are satisfied on the basis of acquisition of an acceptance response corresponding to the identification request from the second external electronic device.

According to certain embodiments, the operation of making the request for identifying the configuration of the address information of the electronic device to the second external electronic device may include an operation of activating, in a first state in which the Bluetooth communication connection is not established with the second external electronic device, a Bluetooth module included in the short-range communication module on the basis of identification of non-configuration of the authentication address information or acquisition of the specific signal in the first state, an operation of establishing the Bluetooth communication connection with the second external electronic device using the address information before acquisition of the configuration information through the activated Bluetooth module, and an operation of making a request for identifying the configuration of the address information to the second external electronic device through the established Bluetooth communication connection.

According to certain embodiments, the operation of configuring the address information of the electronic device using the configuration information may include an operation of performing at least one of 1) an operation of configuring information corresponding to the electronic device among the first Bluetooth address information or the second Bluetooth address information as the local address information of the electronic device, 2) an operation of configuring the other information that does not correspond to the electronic device among the first Bluetooth address information or the second Bluetooth address information as the peer address information of the electronic device, or 3) an operation of configuring the identification information of the first external electronic device as the authentication address information of the electronic device on the basis of identification of satisfaction of the conditions.

According to certain embodiments, the method of configuring the address information by the electronic device may further include an operation of turning of the short-range communication module and charging the battery of the electronic device through the first external electronic device on the basis of identification of non-satisfaction of the conditions.

According to certain embodiments, the electronic device 301 for storing at least one of the first audio electronic device 201 or the second audio electronic device 202 may include the communication module 320 including a short-range communication module, the processor 310 operatively connected to the short-range communication module, and the memory 360 operatively connected to the processor 310 and configured to store configuration information related to a Bluetooth communication connection, wherein the memory 360 may store instructions causing the processor 310 to, when executed, identify that at least one of the first audio electronic device 201 or the second audio electronic device 202 is inserted into the electronic device 301, make a request for identifying a configuration of address information of at least one of first audio electronic device 201 or the second audio electronic device 202 to the first external electronic device 205 through the short-range communication module, and transmit the configuration information to at least one of the first audio electronic device 201 or the second audio electronic device 202 on the basis of acquisition of an acceptance response to the identification request from the first external electronic device 205 through the short-range communication module.

The invention claimed is:
1. An electronic device comprising:
a short-range communication module;
memory storing instructions; and
a processor operatively connected to the short-range communication module and the memory; and wherein the processor configured to:
detecting an insertion of the electronic device into a first external electronic device;
acquire configuration information related to a Bluetooth communication connection from the first external electronic device via the short-range communication module;
identify whether conditions for configuring address information of the electronic device are satisfied; and
configure the address information of the electronic device based on the configuration information when the identification of the conditions is satisfied,
wherein the processor is further configured to:
activate, in a first state in which the Bluetooth communication connection is not established with a second external electronic device, a Bluetooth module included in the short-range communication module based on identification of non-configuration of an authentication address information or acquisition of a specific signal in the first state, and
establish the Bluetooth communication connection with the second external electronic device using the address information before acquisition of the configuration information through the activated Bluetooth module.

2. The electronic device of claim 1, wherein the processor is further configured to: acquire the configuration information from the first external electronic device by activating an NFC module included in the short-range communication module in response to detecting the insertion of the electronic device into the first external electronic device.

3. The electronic device of claim 2, wherein the processor is further configured to: wirelessly or wiredly establish an electrical connection with the first external electronic device, and detect that the electronic device is inserted into the first external electronic device based on identification of switching of the first external electronic device from an open state to a closed state.

4. The electronic device of claim 1, wherein the configuration information includes first Bluetooth address information, second Bluetooth address information, and identification information of the first external electronic device, and the address information of the electronic device, which includes local address information of the electronic device, peer address information, and the authentication address information.

5. The electronic device of claim 4, wherein the processor is further configured to: identify that the conditions are satisfied based on non-configuration of the authentication address information of the electronic device or acquisition of the specific signal from the first external electronic device.

6. The electronic device of claim 4, wherein the processor is further configured to:
make a request for identifying a configuration of the address information of the electronic device to the second external electronic device based on identification of non-configuration of the authentication address information of the electronic device or acquisition of a specific signal from the first external electronic device; and
identify that the conditions are satisfied based on acquisition of an acceptance response corresponding to the identification request from the second external electronic device.

7. The electronic device of claim 6, wherein the processor is further configured to:
make a request for identifying the configuration of the address information to the second external electronic device via the established Bluetooth communication connection.

8. The electronic device of claim 4, wherein the processor is further configured to: perform at least one of 1) an operation of configuring information corresponding to the electronic device among the first Bluetooth address information or the second Bluetooth address information as the local address information of the electronic device, 2) an operation of configuring the other information that does not correspond to the electronic device among the first Bluetooth address information or the second Bluetooth address information as the peer address information of the electronic device, and 3) an operation of configuring the identification information of the first external electronic device as the authentication address information of the electronic device based on identification of satisfaction of the conditions.

9. The electronic device of claim 8, wherein the electronic device is configured to wirelessly receive audio data from the second external electronic device through a Bluetooth module included in the short-range communication module, and wherein the processor is further configured to:
establish a Bluetooth communication connection with another electronic device based on the configured peer address information of the electronic device via the Bluetooth module in response to identification of switching of the first external electronic device from a closed state to an open state.

10. The electronic device of claim 1, further comprising a battery operatively connected to the processor,
wherein the instructions are configured to cause the processor to turn off the short-range communication module and charge the battery through the first external electronic device based on identification of non-satisfaction of the conditions.

* * * * *